United States Patent
Mizuhashi et al.

(10) Patent No.: US 10,488,968 B2
(45) Date of Patent: *Nov. 26, 2019

(54) DISPLAY APPARATUS WITH EXTERNAL OBJECT DETECTION OUTSIDE THE DISPLAY REGION

(71) Applicant: Japan Display Inc., Tokyo (JP)

(72) Inventors: Hiroshi Mizuhashi, Tokyo (JP); Koji Noguchi, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/246,108

(22) Filed: Jan. 11, 2019

(65) Prior Publication Data

US 2019/0146624 A1  May 16, 2019

Related U.S. Application Data

(63) Continuation of application No. 15/470,349, filed on Mar. 27, 2017, now Pat. No. 10,222,887.

(30) Foreign Application Priority Data

Mar. 29, 2016 (JP) ................................ 2016-066803

(51) Int. Cl.
*G06F 3/041* (2006.01)
*G06F 3/044* (2006.01)
*G06K 9/00* (2006.01)

(52) U.S. Cl.
CPC ............ *G06F 3/0412* (2013.01); *G06F 3/044* (2013.01); *G06F 2203/0338* (2013.01);
(Continued)

(58) Field of Classification Search
CPC ................... G06F 3/0412; G06F 3/044; G06F 2203/04104; G06K 9/0002
See application file for complete search history.

(56) References Cited

U.S. PATENT DOCUMENTS 6,401,551 B1 *  6/2002  Kawahara ............ G06K 9/0002
                                                                73/862.337
2003/0016024 A1  1/2003  Teranuma et al.
(Continued)

FOREIGN PATENT DOCUMENTS

| JP | 2003-090703 A | 3/2003 |
| JP | 2004-317353 A | 11/2004 |
| JP | 2012-063839 A | 3/2012 |

OTHER PUBLICATIONS

Japanese Office Action dated May 14, 2019, corresponding to Japanese Patent Application No. 2016-066803.

*Primary Examiner* — Ryan A Lubit

(74) *Attorney, Agent, or Firm* — Michael Best & Friedrich LLP

(57) ABSTRACT

According to an aspect, a display apparatus with a touch detection function includes: a display device including a display region in which a plurality of pixels are arranged; a pixel signal line that transmits a pixel signal to the pixel; outer display region wiring including wiring that is electrically coupled to the pixel signal line and extends along a predetermined direction outside the display region; and a touch detection electrode arranged at a position overlapping the outer display region wiring in a non-contact state, a longitudinal direction of the touch detection electrode being along a direction intersecting with the predetermined direction.

15 Claims, 24 Drawing Sheets

(52) U.S. Cl.
    CPC .............. *G06F 2203/04101* (2013.01); *G06F 2203/04108* (2013.01); *G06K 9/0002* (2013.01)

(56) References Cited

U.S. PATENT DOCUMENTS

| | | | |
|---|---|---|---|
| 2004/0247163 | A1 | 12/2004 | Hara |
| 2012/0062511 | A1 | 3/2012 | Ishizaki et al. |
| 2014/0354596 | A1* | 12/2014 | Djordjev .............. G06K 9/0002 345/175 |
| 2015/0022484 | A1* | 1/2015 | Chiu ..................... G06F 3/0412 345/174 |
| 2015/0254491 | A1* | 9/2015 | Mo ....................... G06F 3/0416 345/174 |
| 2016/0357306 | A1* | 12/2016 | Zou ..................... G02F 1/13338 |
| 2017/0024069 | A1* | 1/2017 | Kihara ................. G06F 3/0488 |
| 2017/0061193 | A1* | 3/2017 | Young ................ G06K 9/00013 |
| 2018/0046281 | A1* | 2/2018 | Pi ........................ A61B 5/02416 |
| 2018/0143711 | A1* | 5/2018 | Ono ........................ G06F 3/044 |

* cited by examiner

FIG.23

| | TIME | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | ... |
| P | 1 TO 64 | 1 TO 32 | 1 TO 16, 33 TO 48 | 1 TO 16, 49 TO 64 | 1 TO 8, 17 TO 24, 33 TO 40, 49 TO 56 | 1 TO 8, 17 TO 24, 41 TO 48, 57 TO 64 | 1 TO 8, 25 TO 40, 57 TO 64 | 1 TO 8, 25 TO 32, 41 TO 56 | 1 TO 4, 9 TO 12, 17 TO 20, 25 TO 28, 33 TO 36, 41 TO 44, 49 TO 52, 57 TO 60 | 1 TO 4, 9 TO 12, 17 TO 20, 25 TO 28, 37 TO 40, 45 TO 48, 53 TO 56, 61 TO 64 | 1 TO 4, 9 TO 12, 21 TO 24, 29 TO 36, 41 TO 44, 53 TO 56, 61 TO 64 | 1 TO 4, 9 TO 12, 21 TO 24, 29 TO 32, 37 TO 40, 45 TO 52, 57 TO 60 | ... |
| N | - | 33 TO 64 | 17 TO 32, 49 TO 64 | 17 TO 48 | 9 TO 16, 25 TO 32, 41 TO 48, 57 TO 64 | 9 TO 16, 25 TO 40, 49 TO 56 | 9 TO 24, 41 TO 56 | 9 TO 24, 33 TO 40, 57 TO 64 | 5 TO 8, 13 TO 16, 21 TO 24, 29 TO 32, 37 TO 40, 45 TO 48, 53 TO 56, 61 TO 64 | 5 TO 8, 13 TO 16, 21 TO 24, 29 TO 32, 33 TO 36, 41 TO 44, 49 TO 52, 57 TO 60 | 5 TO 8, 13 TO 16, 17 TO 20, 25 TO 28, 37 TO 40, 45 TO 52, 57 TO 60 | 5 TO 8, 13 TO 16, 17 TO 20, 25 TO 28, 33 TO 36, 41 TO 44, 53 TO 56, 61 TO 64 | ... |

DISPLAY APPARATUS WITH EXTERNAL OBJECT DETECTION OUTSIDE THE DISPLAY REGION

CROSS-REFERENCE TO RELATED APPLICATIONS

The present application is a Continuation Application of U.S. patent application Ser. No. 15/470,349 filed Mar. 27, 2017, which in turn claims priority from Japanese Application No. 2016-066803, filed on Mar. 29, 2016, the contents of which are incorporated by reference herein in its entirety.

BACKGROUND

1. Technical Field

The present invention relates to a display apparatus with a touch detection function.

2. Description of the Related Art

In recent years, a touch detection apparatus that can detect an external proximity object, what is called a touch panel, has been paid attention. The touch panel is, for example, mounted on or integrated with a display device such as a liquid crystal display device, which is used as a display apparatus with a touch detection function. A display apparatus with a touch detection function disclosed in Japanese Patent Application Laid-open Publication No. 2004-317353 causes various button images and the like to be displayed on the display device to enable users to input information using the touch panel in place of a typical mechanical button.

A fingerprint sensor is included in an electronic apparatus with the display apparatus in some cases. A fingerprint sensor disclosed in Japanese Patent Application Laid-open Publication No. 2003-90703 detects roughness of a fingerprint of a human finger in a contact state to detect its fingerprint pattern. A detection result of the fingerprint sensor is used for personal identification, for example.

In the related art, a fingerprint sensor arranged in an electronic apparatus including a display apparatus is independent of a configuration related to a display output of the display apparatus. Due to this, wiring included in the display apparatus has been difficult to be used as a configuration related to touch detection such as the fingerprint sensor.

For the foregoing reasons, there is a need for a display apparatus with a touch detection function that can use the wiring included in the display apparatus as the configuration related to touch detection.

SUMMARY

According to an aspect, a display apparatus with a touch detection function includes: a display device including a display region in which a plurality of pixels are arranged; a pixel signal line that transmits a pixel signal to the pixel; outer display region wiring including wiring that is electrically coupled to the pixel signal line and extends along a predetermined direction outside the display region; and a touch detection electrode arranged at a position overlapping the outer display region wiring in a non-contact state, a longitudinal direction of the touch detection electrode being along a direction intersecting with the predetermined direction.

BRIEF DESCRIPTION OF THE DRAWINGS

FIG. 23 is a table illustrating an example of a relation between a target to which a positive code is added and a target to which a negative code is added at the same time in the code division multiplex system;

DETAILED DESCRIPTION

Figure 1:
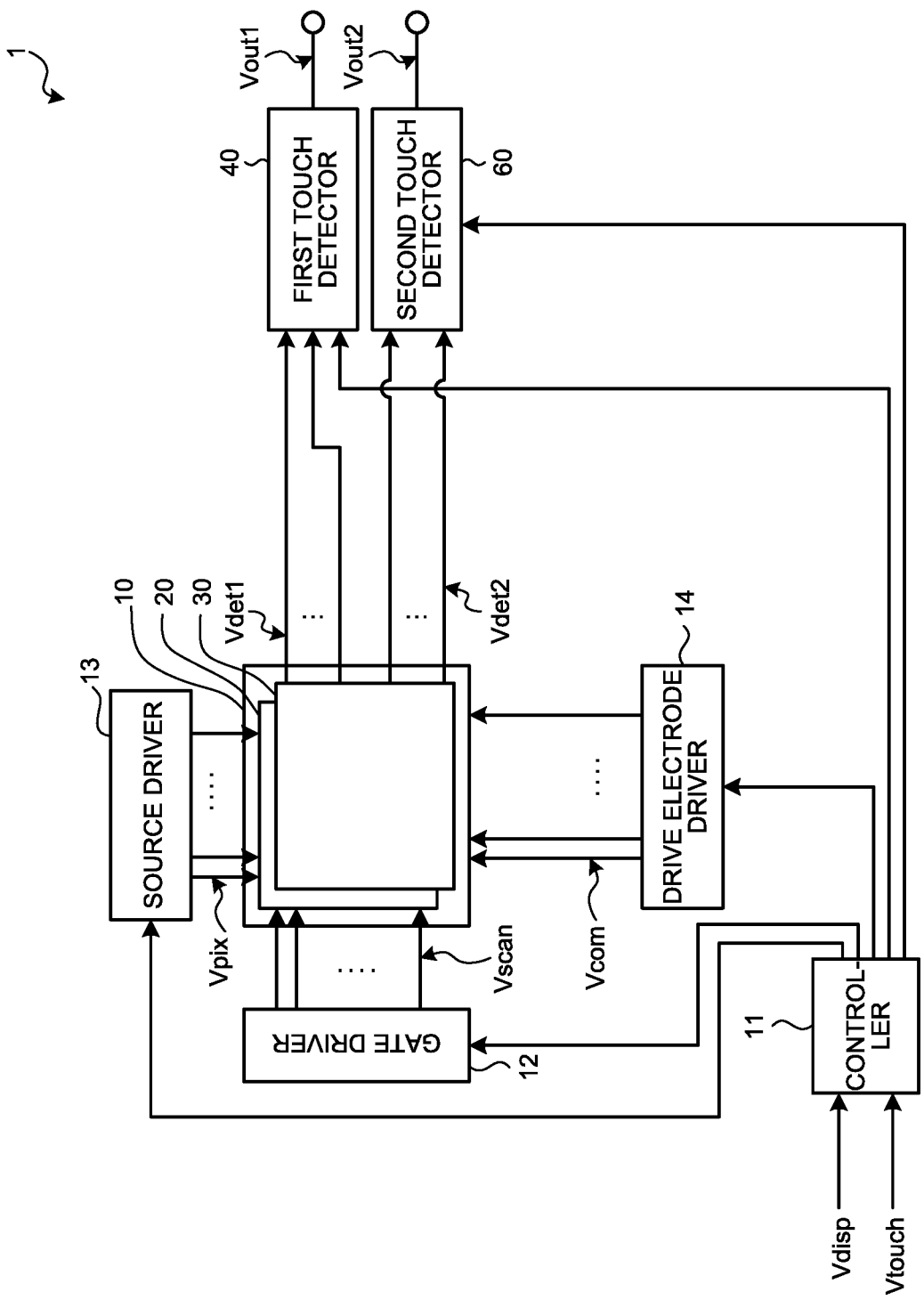
FIG. 1 is a block diagram illustrating a configuration example of a display apparatus with a touch detection function according to an embodiment.

The following describes a mode for carrying out the invention (embodiments) in detail with reference to the drawings. The present invention is not limited to the embodiments described below. Components described below include a component that is easily conceivable by those skilled in the art and components that are substantially the same. The components described below can be appropriately combined. The disclosure is merely an example, and the present invention naturally encompasses an appropriate modification maintaining the gist of the invention that is easily conceivable by those skilled in the art. To further clarify the description, the width, the thickness, the shape, and the like of each component may be schematically illustrated in the drawings as compared with an actual aspect. However, the drawings merely provide examples, and are not intended to limit interpretation of the invention. The same element as that described in the drawing already discussed is denoted by the same reference numeral throughout the description and the drawings, and detailed description thereof will not be repeated in some cases.

In this disclosure, when an element is described as being "on" another element, the element can be directly on the other element, or there can be one or more elements between the element and the other element.

First Embodiment

FIG. 1 is a block diagram illustrating a configuration example of a display apparatus 1 with a touch detection function according to an embodiment. As illustrated in FIG. 1, the display apparatus 1 with a touch detection function includes a display device 10 with a touch detection function, a controller 11, a gate driver 12, a source driver 13, a drive electrode driver 14, a first touch detector 40, and a second touch detector 60. In the display apparatus 1 with a touch detection function, a touch detection function is incorporated in the display device 10 with a touch detection function. The display device 10 with a touch detection function is a device in which a display panel 20 including a liquid crystal display element as a display element is integrated with a touch panel 30 for detecting a touch operation in a display region 101a (refer to FIG. 10) of the display panel 20. The display device 10 with a touch detection function may be what is called an on-cell device in which the touch panel 30 is mounted on the display panel 20. In a case where the display device 10 with a touch detection function is the on-cell device, the display panel 20 and the touch panel 30 are individually arranged. The configuration of the display panel 20 is not limited to the configuration including a liquid crystal display element as a display element. For example, the display panel 20 may be an organic EL display panel. Hereinafter, an operation related to "proximity or contact of an object to or with the detection region" may be referred to as a "touch operation". "Detection of proximity or contact of an object" may be referred to as "touch detection".

As described later, the display panel 20 is an element that sequentially performs scanning for each horizontal line to perform display in accordance with a scanning signal Vscan supplied from the gate driver 12. The controller 11 is a circuit that supplies a control signal to each of the gate driver 12, the source driver 13, the drive electrode driver 14, the first touch detector 40, and the second touch detector 60 based on a video signal Vdisp supplied from the outside to control these components to operate in synchronization with each other.

The gate driver 12 has a function of sequentially selecting one horizontal line to be a display driving target of the display device 10 with a touch detection function based on the control signal supplied from the controller 11.

The source driver 13 is a circuit that supplies a pixel signal Vpix to each sub-pixel SPix (described later) in the display device 10 with a touch detection function based on the control signal supplied from the controller 11.

The drive electrode driver 14 is a circuit that supplies a drive signal Vcom to a drive electrode COML (described later) in the display device 10 with a touch detection function based on the control signal supplied from the controller 11.

Figure 10:
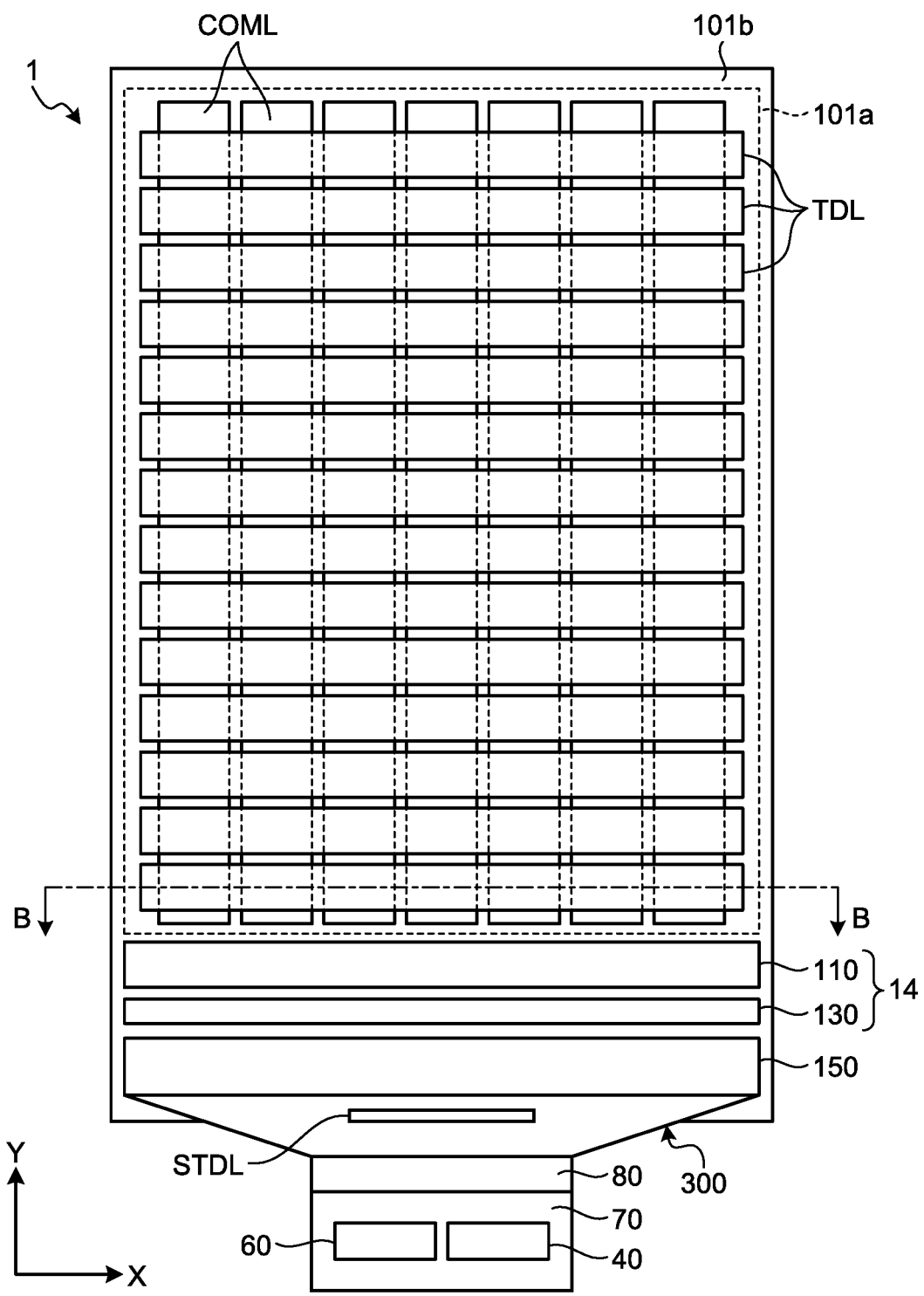
FIG. 10 is a plan view schematically illustrating a configuration especially related to touch detection in the display apparatus with a touch detection function.

The touch panel 30 operates based on a basic principle of capacitance touch detection, and performs a touch detection operation using a mutual capacitance system to detect contact or proximity of an external object (conductor or dielectrics) with or to a detection region including a display region 101a (refer to FIG. 10, for example). The touch panel 30 may perform the touch detection operation using a self capacitance system.

Figure 2:
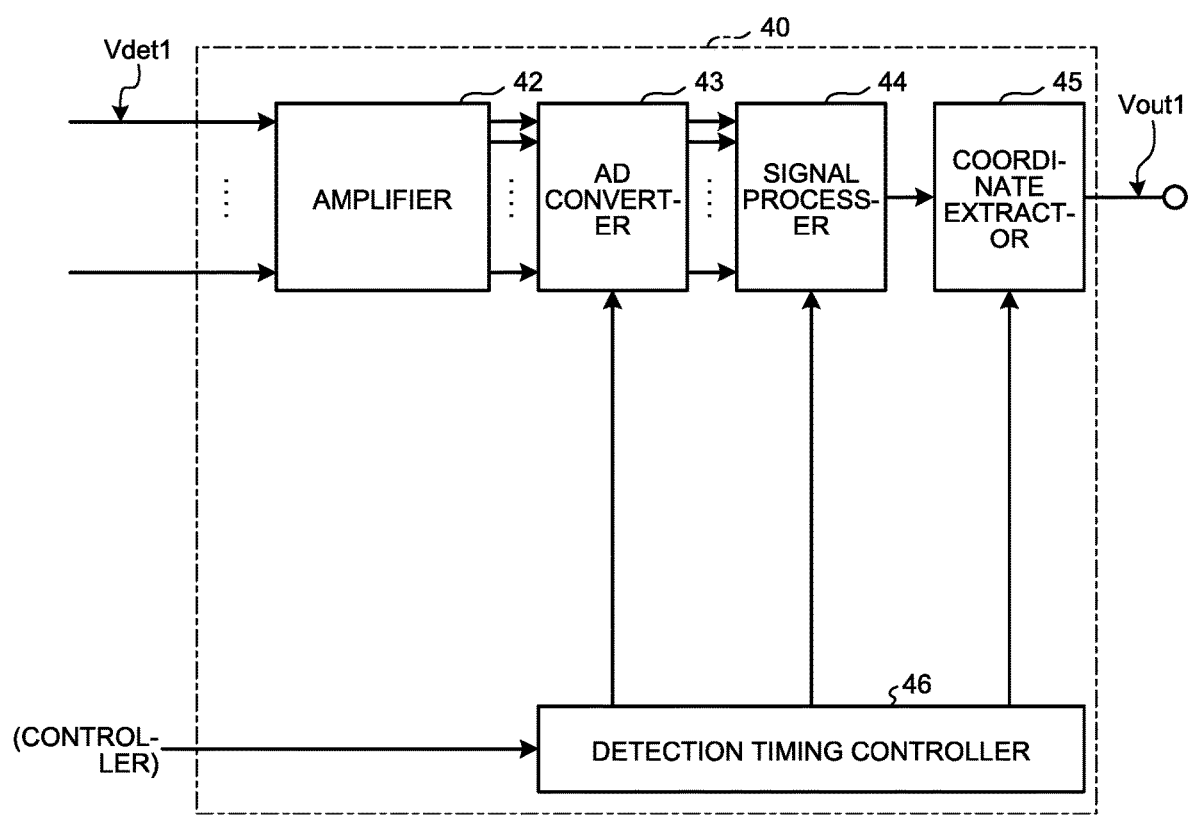
FIG. 2 is a block diagram illustrating a principal function configuration of a first touch detector.

FIG. 2 is a block diagram illustrating a principal function configuration of the first touch detector 40. The first touch detector 40 is a circuit that detects a touch operation performed on the touch panel 30 based on the control signal such as a clock signal supplied from the controller 11 and a first touch detection signal Vdet1 supplied from the touch panel 30. The first touch detector 40 obtains coordinates at which a touch operation is performed when a touch operation is detected. The first touch detector 40 includes an amplifier 42, an A/D converter 43, a signal processor 44, and a coordinate extractor 45. A detection timing controller 46 controls the A/D converter 43, the signal processor 44, and the coordinate extractor 45 based on the control signal supplied from the controller 11 such that the A/D converter 43, the signal processor 44, and the coordinate extractor 45 operate in synchronization with each other.

Figure 3:
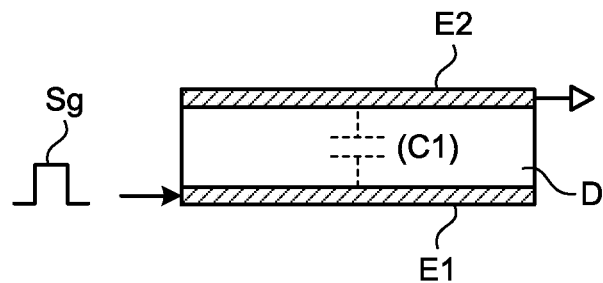
FIG. 3 is an explanatory diagram for explaining a basic principle of mutual capacitance touch detection and illustrates a state in which a finger is in a non-contact state or a non-proximate state.
Figure 4:
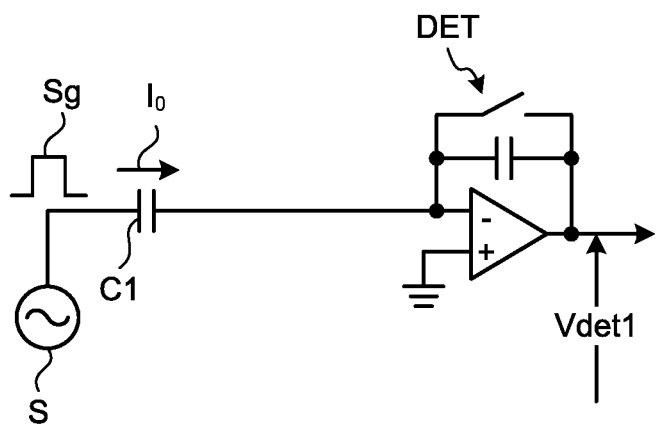
FIG. 4 is an explanatory diagram illustrating an example of an equivalent circuit of a state in which a finger is in a non-contact state or a non-proximate state illustrated in FIG. 3.
Figure 5:
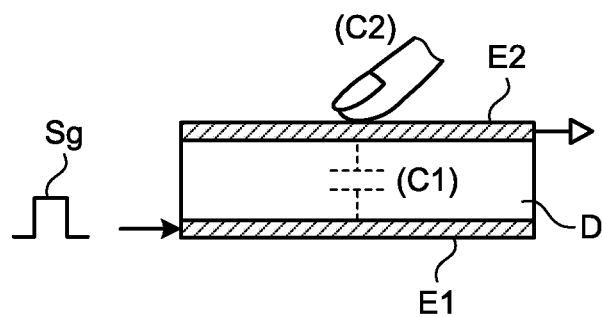
FIG. 5 is an explanatory diagram for explaining the basic principle of mutual capacitance touch detection and illustrates a state in which a finger is in a contact state or a proximate state.
Figure 6:
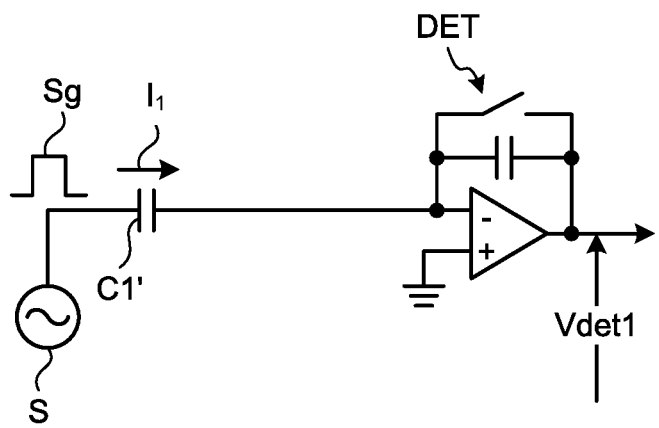
FIG. 6 is an explanatory diagram illustrating an example of an equivalent circuit of a state in which a finger is in a contact state or a proximate state illustrated in FIG. 5.
Figure 7:
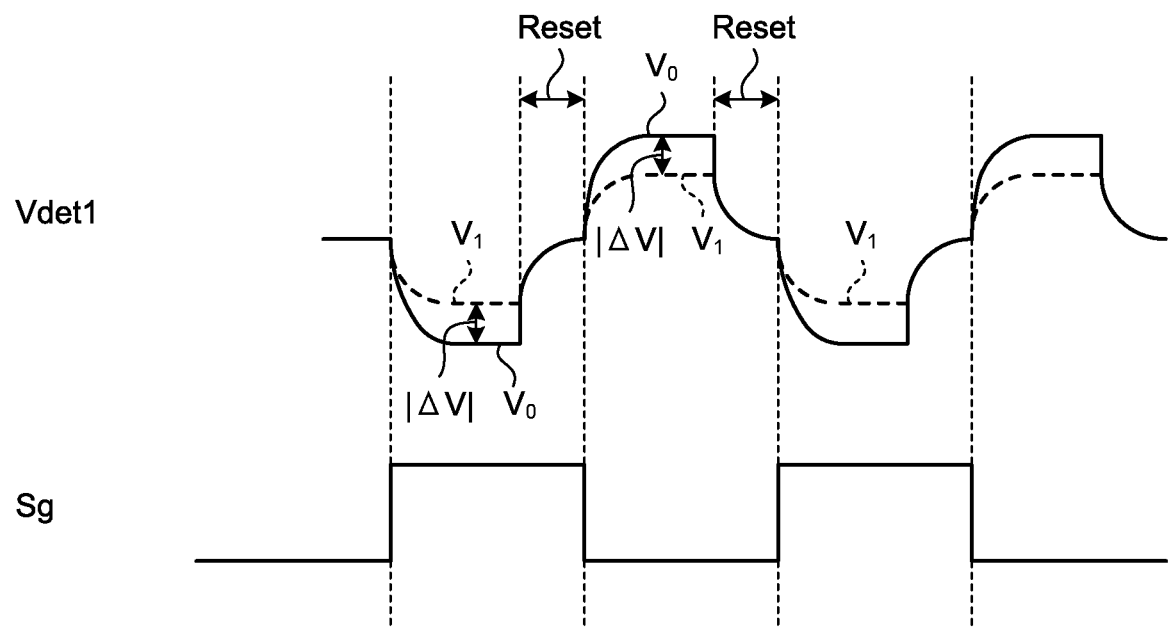
FIG. 7 is a diagram illustrating an example of waveforms of a drive signal and a first touch detection signal in mutual capacitance touch detection.

As described above, the touch panel 30 operates based on the basic principle of capacitance touch detection. With reference to FIGS. 3 to 7, the following describes the basic principle of mutual capacitance touch detection performed with the touch panel 30 according to the present embodiment. FIG. 3 is an explanatory diagram for explaining a basic principle of mutual capacitance touch detection and illustrates a state in which a finger is in a non-contact state or a non-proximate state. FIG. 4 is an explanatory diagram illustrating an example of an equivalent circuit of the state in which the finger is in a non-contact state or a non-proximate state as illustrated in FIG. 3. FIG. 5 is an explanatory diagram for explaining the basic principle of mutual capacitance touch detection and illustrates a state in which the finger is in a contact state or a proximate state. FIG. 6 is an explanatory diagram illustrating an example of an equivalent circuit of the state in which the finger is in a contact state or a proximate state as illustrated in FIG. 5. FIG. 7 is a diagram illustrating an example of waveforms of the drive signal Vcom and the first touch detection signal Vdet1. The following describes a case in which a finger as an external proximity object is brought into contact with or proximate to the touch panel. Alternatively, for example, the external proximity object is not limited to the finger and may be an object including an external object such as a stylus pen may be replaced with the finger. The drive signal Vcom represents a signal output to the drive electrode COML, and does not represent a signal based on a specific voltage.

For example, as illustrated in FIG. 3, a capacitive element C1 includes a pair of electrodes arranged to be opposed to each other with a dielectric D interposed therebetween, the pair of electrodes being a drive electrode E1 and a touch detection electrode E2. As illustrated in FIG. 4, one end of the capacitive element C1 is coupled to an alternating current (AC) signal source (driving signal source) S, and the other end thereof is coupled to a voltage detector DET. The voltage detector DET is, for example, an integrating circuit included in the amplifier 42 illustrated in FIG. 2.

When an AC rectangular wave Sg having a predetermined frequency (for example, a frequency on the order of several kHz to several hundred kilohertz) is applied to the drive electrode E1 (one end of the capacitive element C1) from the AC signal source S, an output waveform (first touch detection signal Vdet1) as illustrated in FIG. 7 appears via the voltage detector DET coupled to the touch detection electrode E2 (the other end of the capacitive element C1). The AC rectangular wave Sg corresponds to the drive signal Vcom input from the drive electrode driver 14, for example.

In a state in which the finger is not in contact with or proximate to the touch panel (non-contact state), as illustrated in FIGS. 3 and 4, a current $I_0$ corresponding to a capacitance value of the capacitive element C1 flows with charge and discharge of the capacitive element C1. The voltage detector DET illustrated in FIG. 4 converts change in the current $I_0$ according to the AC rectangular wave Sg into change in voltage (a waveform $V_0$ of a solid line (refer to FIG. 7)).

In a state in which the finger is in contact with or proximate to the touch panel (contact state), as illustrated in FIG. 5, capacitance C2 formed by the finger is in contact with or proximate to the touch detection electrode E2, so that capacitance corresponding to a fringe between the drive electrode E1 and the touch detection electrode E2 is shielded. Due to this, as illustrated in FIG. 6, the capacitive element C1 functions as a capacitive element C1' having a capacitance value smaller than the capacitance value in a non-contact state. With reference to the equivalent circuit illustrated in FIG. 6, a current $I_1$ flows through the capacitive element C1'. As illustrated in FIG. 7, the voltage detector DET converts change in the current $I_1$ according to the AC rectangular wave Sg into change in voltage (a waveform $V_1$ of a dotted line). In this case, amplitude of the waveform $V_1$ is smaller than that of the waveform $V_0$ described above. Accordingly, an absolute value $|\Delta V|$ of a voltage difference between the waveform $V_0$ and the waveform $V_1$ varies depending on influence of an external object such as a finger that is brought into contact with or proximate to the touch panel. To accurately detect the absolute value $|\Delta V|$ of the voltage difference between the waveform $V_0$ and the waveform $V_1$, it is more preferable to provide, for an operation of the voltage detector DET, a period Reset for resetting charge and discharge of a capacitor in accordance with a frequency of the AC rectangular wave Sg through switching in the circuit.

The touch panel 30 illustrated in FIG. 1 sequentially performs scanning for each detection block in accordance with the drive signal Vcom supplied from the drive electrode driver 14 to perform mutual capacitance touch detection.

The touch panel 30 includes a plurality of first touch detection electrodes TDL, which will be described later, and the first touch detection electrodes TDL output the first touch detection signal Vdet1 for each detection block via the voltage detector DET illustrated in FIG. 4 or FIG. 6. The first touch detection signal Vdet1 is supplied to the amplifier 42 of the first touch detector 40.

The amplifier 42 amplifies the first touch detection signal Vdet1 supplied from the touch panel 30. The amplifier 42 may include an analog low pass filter (LPF) that removes a high frequency component (noise component) from the first touch detection signal Vdet1 and outputs the remaining component.

The A/D converter 43 samples each analog signal output from the amplifier 42 at a timing synchronized with the drive signal Vcom, and converts the analog signal into a digital signal.

The signal processor 44 includes a digital filter that reduces a frequency component (noise component) included in the output signal of the A/D converter 43, the noise component having a frequency other than a frequency at which the drive signal Vcom is sampled. The signal processor 44 is a logic circuit that detects a touch operation performed on the touch panel 30 based on the output signal of the A/D converter 43. The signal processor 44 performs processing of extracting only a difference of the detection signal caused by the finger. The signal of the difference caused by the finger has the absolute value $|\Delta V|$ of the difference between the waveform $V_0$ and the waveform $V_1$ described above. The signal processor 44 may perform an arithmetic operation for averaging the absolute values $|\Delta V|$ on a detection block basis to obtain an average value of the absolute value $|\Delta V|$. Due to this, the signal processor 44 can suppress influence of the noise. The signal processor 44 compares the detected signal of the difference caused by the finger with a predetermined threshold voltage. If the signal of the difference is smaller than the threshold voltage, the signal processor 44 determines that an external proximity object is in a non-contact state. If the signal of the difference is equal to or larger than the threshold voltage, the signal processor 44 determines that the external proximity object is in a contact state. In this way, the first touch detector 40 can perform touch detection. In this way, the first touch detector 40 detects the touch operation based on change in capacitance in the first touch detection electrode TDL.

The coordinate extractor 45 is a logic circuit that obtains, when a touch operation is detected by the signal processor 44, touch panel coordinates at which the touch is detected. The coordinate extractor 45 outputs a detection signal output Vout1 indicating the touch panel coordinates. As described above, the touch panel 30 according to the present embodiment can detect the touch panel coordinates of the position where an object such as a finger is in contact with or proximate to, based on the basic principle of mutual capacitance touch detection.

Figure 8:
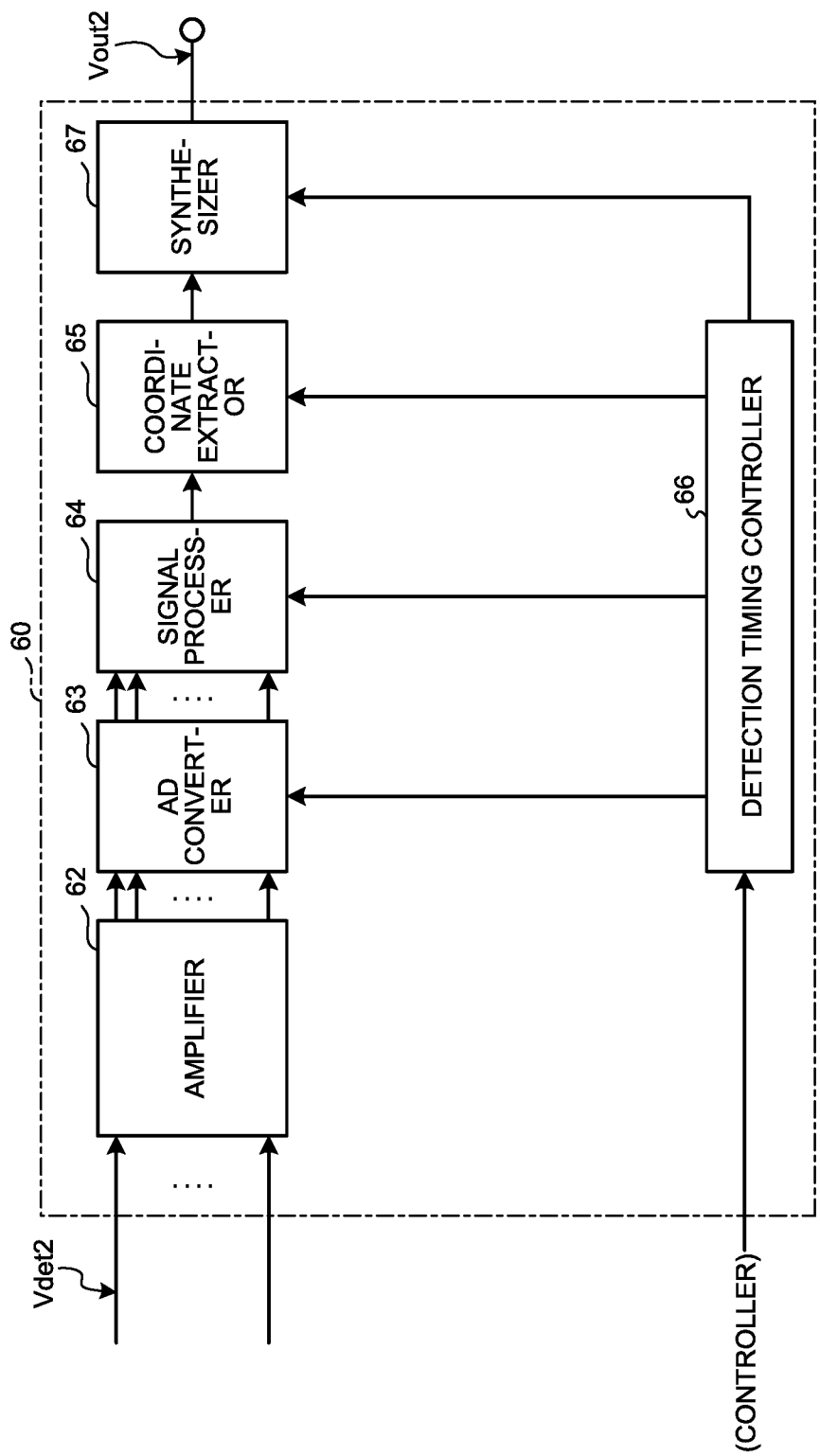
FIG. 8 is a block diagram illustrating a principal function configuration of a second touch detector.

FIG. 8 is a block diagram illustrating a principal function configuration of the second touch detector 60. The second touch detector 60 is a circuit that detects whether there is a touch operation at a finer pitch than the first touch detector 40 based on a control signal such as a clock signal supplied from the controller 11 and a second touch detection signal Vdet2 supplied from the touch panel 30. The second touch detector 60 includes, for example, an amplifier 62, an A/D converter 63, a signal processor 64, a coordinate extractor 65, a detection timing controller 66, and a synthesizer 67. Functions of the amplifier 62, the A/D converter 63, the signal processor 64, the coordinate extractor 65, and the detection timing controller 66 are similar to the functions of the amplifier 42, the A/D converter 43, the signal processor 44, the coordinate extractor 45, and the detection timing controller 46. The relation between the second touch detector 60 and a second touch detection electrode STDL (refer to FIG. 14, for example) is similar to the relation between the first touch detector 40 and the first touch detection electrode TDL. The second touch detection signal Vdet2 from the second touch detection electrode STDL is supplied to the amplifier 62 of the second touch detector 60.

Figure 9:
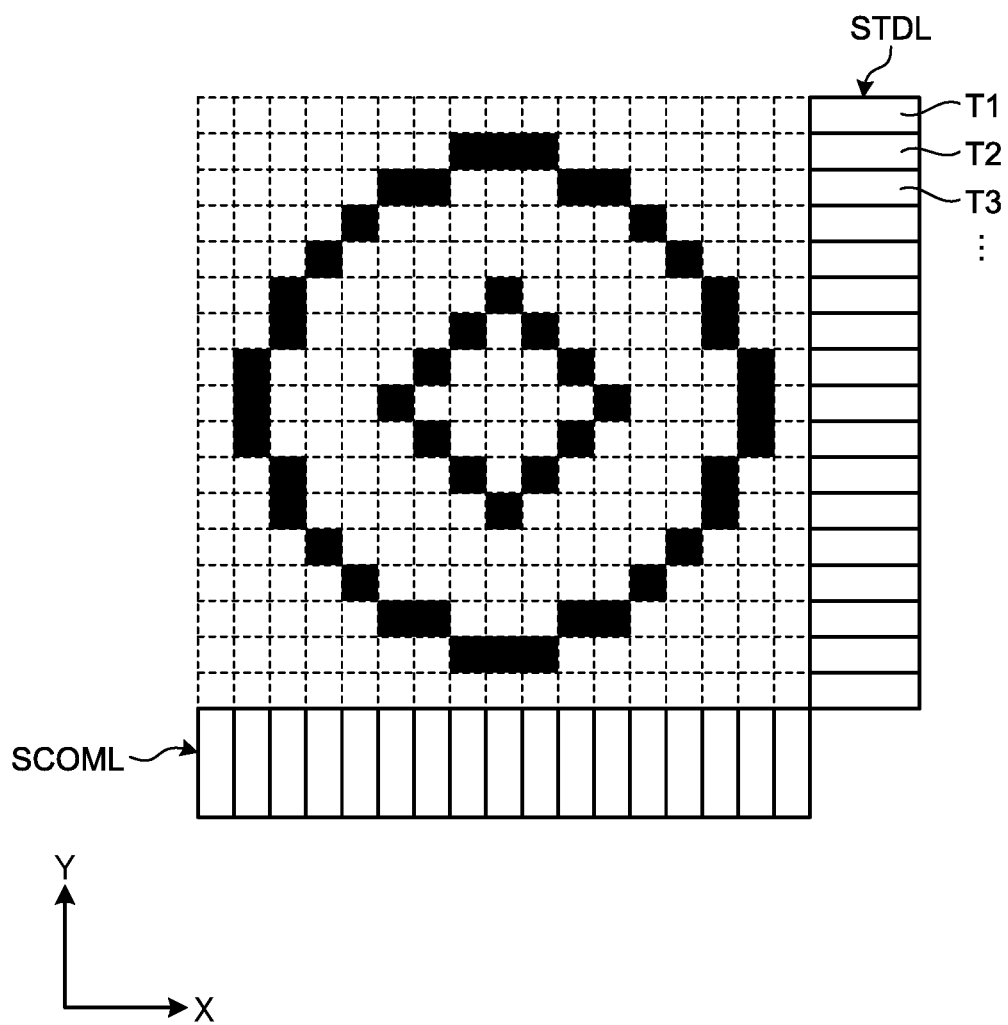
FIG. 9 is a schematic diagram illustrating a mechanism of fingerprint detection performed by the second touch detector.

FIG. 9 is a schematic diagram illustrating a mechanism of fingerprint detection performed by the second touch detector 60. The synthesizer 67 combines, for example, a plurality of second touch detection signals Vdet2 obtained through a plurality of times of touch detection using the second touch detection electrode STDL to generate two-dimensional information indicating a shape of the external proximity object performing a touch operation on the second touch detection electrodes STDL. Specifically, the synthesizer 67 generates a two-dimensional image representing, in terms of a shade of color (for example, a gray scale), a difference in detected intensity corresponding to a difference in a degree of contact with a covering member 5 (refer to FIG. 11) caused by roughness of the external proximity object (for example, a human finger). An output Vout2 of the second touch detector 60 including the synthesizer 67 is, for example, an output of the two-dimensional information described above.

In the present embodiment, assumption is made that a sweep operation is performed. The sweep operation is an operation such that a human finger relatively moves in a direction intersecting with an extending direction of one second touch detection electrode STDL. When the sweep operation is performed, as illustrated in FIG. 9, each of intersecting points of a plurality of drive electrodes SCOML (described later) and one second touch detection electrode STDL functions as an individual detection block to output a detection result corresponding to roughness of a fingerprint of the finger. A position of the finger in proximity to the second touch detection electrode STDL is changed at each time (reference numerals T1, T2, T3, . . . illustrated in FIG. 9) due to the movement of the finger performing the sweep operation, so that the finger can be two-dimensionally scanned by one second touch detection electrode STDL. The synthesizer 67 arranges such one-dimensional detection results in a time series manner (reference numerals T1, T2, T3, . . . in FIG. 9) and combines them to obtain a two-dimensional image.

For ease of understanding, FIG. 9 exemplifies two-gradation detection indicating only whether there is a touch operation. However, the touch detection result in each block may actually have multi-gradation. In FIG. 9, a detected external proximity object is an object having a double-circled projection. Alternatively, when the external proximity object is a human finger having fingerprints, the fingerprints appear as two-dimensional information. The function of the synthesizer 67 may be included in a configuration other than the second touch detector 60. For example, the output Vout2 of the second touch detector 60 may be an output of the coordinate extractor 65, and the two-dimensional information may be generated by an external configuration based on the output Vout2. The configuration related to generation of the two-dimensional information may be implemented as hardware such as a circuit, or may be made through what is called software processing.

Figure 11:
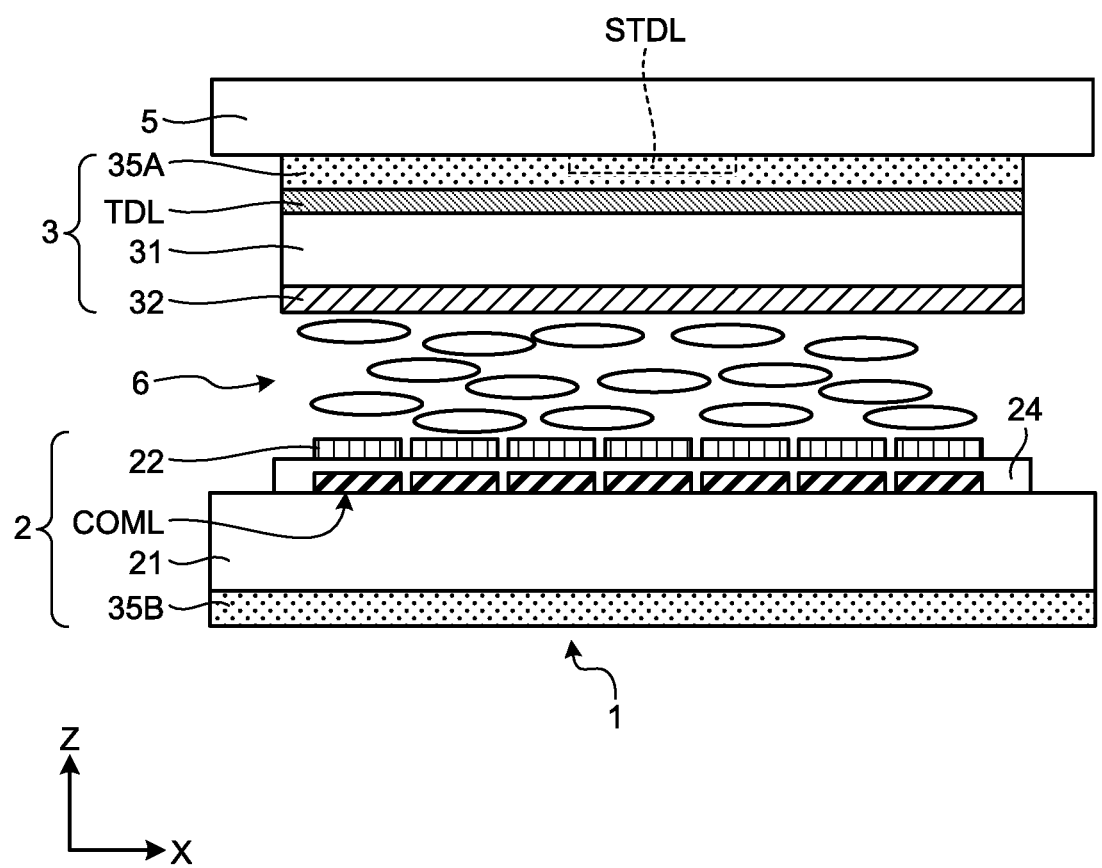
FIG. 11 is a B-B cross-sectional view representing a schematic structure of the display apparatus with a touch detection function.
Figure 12:
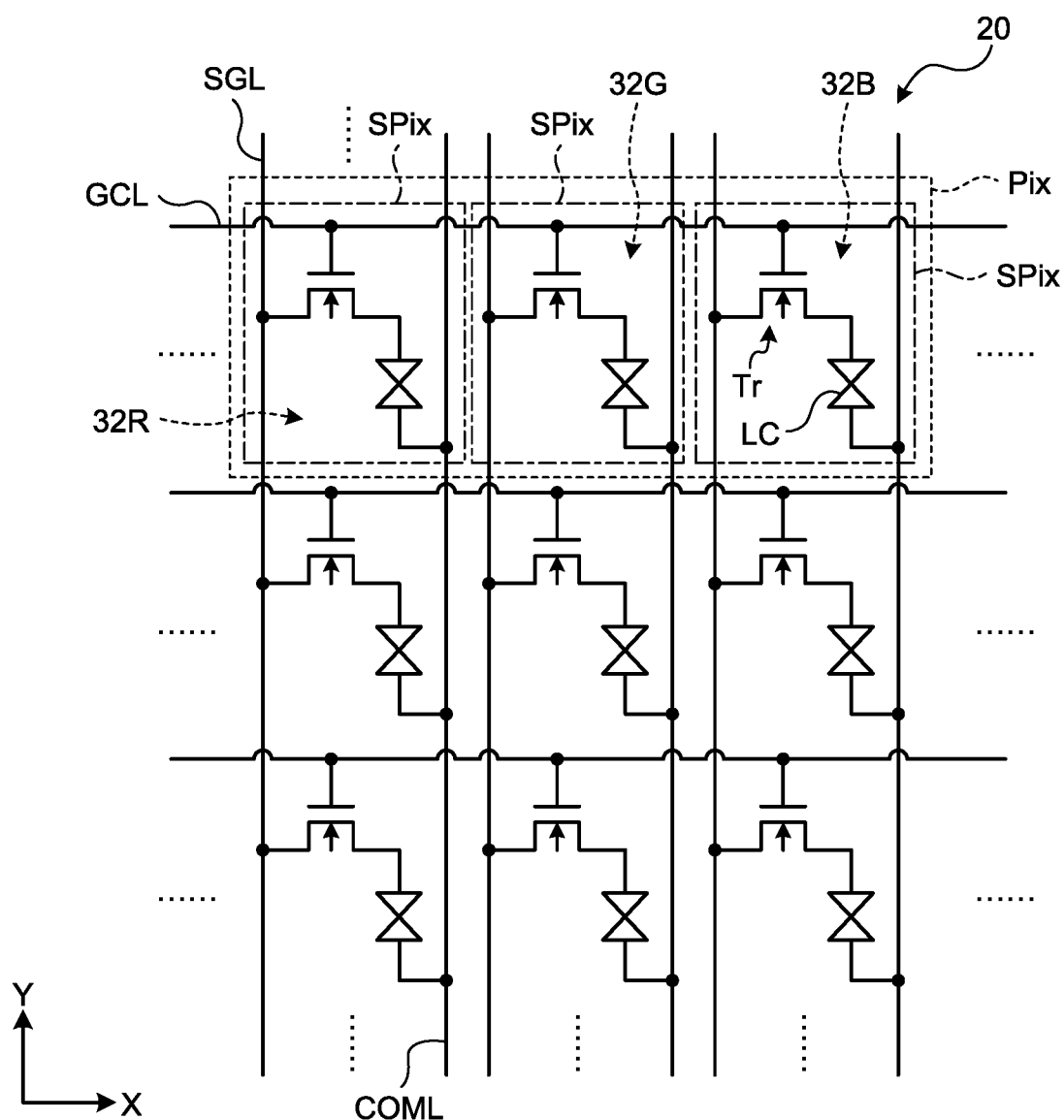
FIG. 12 is a circuit diagram of a pixel array of a display device with a touch detection function according to the embodiment.

Next, the following describes a configuration example of the display apparatus 1 with a touch detection function in detail. FIG. 10 is a plan view schematically illustrating a configuration especially related to touch detection in the display apparatus 1 with a touch detection function. FIG. 11 is a B-B cross-sectional view representing a schematic structure of the display apparatus 1 with a touch detection function. FIG. 12 is a circuit diagram of a pixel array of the display device 10 with a touch detection function according to the embodiment. In the display region 101a of the display device 10 with a touch detection function, as illustrated in FIG. 12, a plurality of pixels are arranged as a configuration of the display panel 20. Hereinafter, the "display device" specifically indicates a configuration formed in the display region 101a among configurations of the display panel 20.

As illustrated in FIG. 11, the display apparatus 1 with a touch detection function includes a pixel substrate 2 and a counter substrate 3. The pixel substrate 2 and the counter substrate 3 are arranged in a superimposed manner. The display apparatus 1 with a touch detection function includes, for example, the display region 101a for displaying an image, and a frame region 101b outside the display region 101a as illustrated in FIG. 10. For example, the display region 101a has a rectangular shape having a long side and a short side, but the shape of the display region 101a can be appropriately changed. The frame region 101b has a frame shape surrounding part of or the entire edge of the display region 101a.

A plurality of drive electrodes COML and a plurality of first touch detection electrodes TDL are arranged in the display region 101a. The drive electrodes COML extend in a predetermined direction of the display region 101a, and are arranged in parallel with each other in a direction orthogonal to the predetermined direction. Specifically, for example, the drive electrodes COML extend in a direction along one side of the display region 101a having a rectangular shape, and are arranged in parallel with each other in a direction along the other side thereof orthogonal to the one side. The first touch detection electrodes TDL extend, for example, in a direction orthogonal to the predetermined direction in which the drive electrodes COML extend, and are arranged in parallel with each other in the predetermined direction. The extending direction of the first touch detection electrode TDL is assumed to be the X-direction. The extending direction of the drive electrodes COML is assumed to be the Y-direction. The direction orthogonal to the X-direction and the Y-direction is assumed to be the Z-direction.

The pixel substrate 2 includes a TFT substrate 21 serving as a circuit board, a plurality of pixel electrodes 22 arranged in a matrix on the upper side of the TFT substrate 21, the drive electrodes COML arranged between the TFT substrate 21 and the pixel electrode 22, and an insulating layer 24 that insulates the pixel electrode 22 from the drive electrode COML. A polarizing plate 35B may be arranged on the lower side of the TFT substrate 21 via a bonding layer.

The counter substrate 3 includes a glass substrate 31 and a color filter 32 formed on one surface of the glass substrate 31. The first touch detection electrode TDL serving as a detection electrode of the touch panel 30 is arranged on the other surface of the glass substrate 31. A polarizing plate 35A is arranged on the upper side of the first touch detection electrode TDL.

Figure 16:
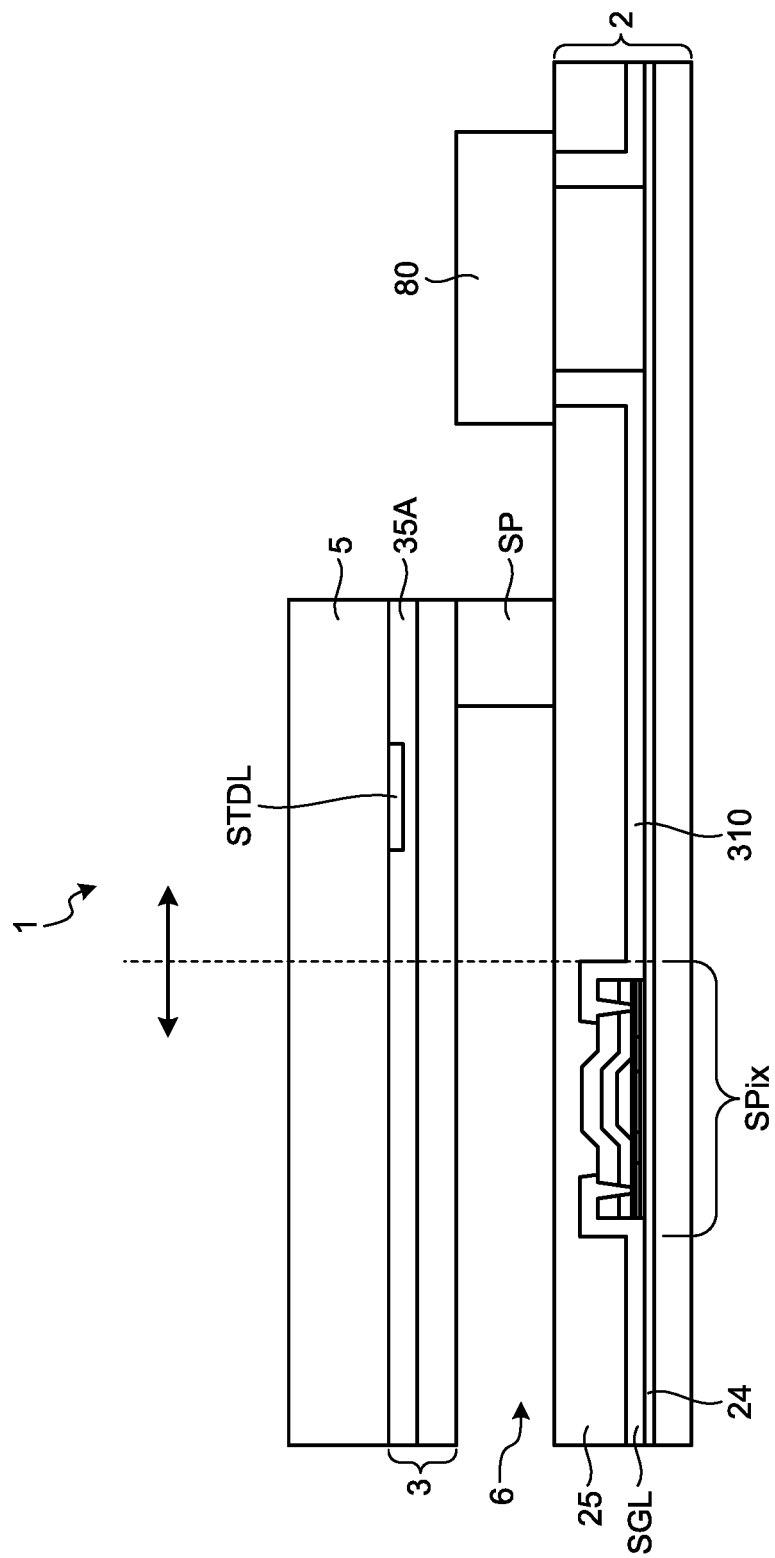
FIG. 16 is a diagram illustrating an arrangement example of the second touch detection electrode.
Figure 17:
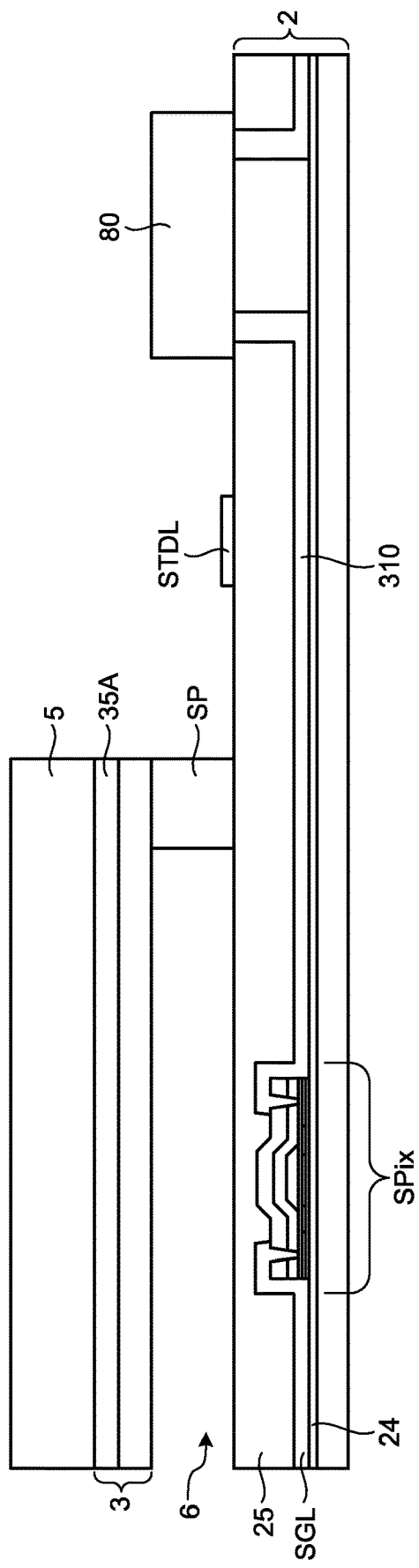
FIG. 17 is a diagram illustrating an arrangement example of the second touch detection electrode.

The TFT substrate 21 and the glass substrate 31 are arranged to be opposed to each other with a predetermined gap therebetween via a spacer SP (refer to FIG. 16 and FIG. 17). A liquid crystal layer 6 is arranged in a space between the TFT substrate 21 and the glass substrate 31. The liquid crystal layer 6 modulates light passing therethrough depending on a state of an electric field. For example, used are liquid crystals of lateral electric-field mode such as in-plane switching (IPS) including fringe field switching (FFS). An orientation film may be arranged between the liquid crystal layer 6 and the pixel substrate 2, and between the liquid crystal layer 6 and the counter substrate 3 illustrated in FIG. 11.

A thin film transistor element (hereinafter, referred to as a TFT element) Tr of each sub-pixel SPix illustrated in FIG. 12, and wiring such as pixel signal lines SGL and scanning signal lines GCL are provided at the TFT substrate 21. The pixel signal line SGL supplies the pixel signal Vpix to the pixel electrode 22, and the scanning signal line GCL supplies the drive signal Vcom for driving the TFT element Tr. The pixel signal line SGL and the scanning signal line GCL extend along a plane parallel to the surface of the TFT substrate 21. The pixel signal line SGL serves as wiring that transmits the pixel signal Vpix to each of the pixels (sub-pixels SPix) arranged in the display region 101a.

The display panel 20 illustrated in FIG. 12 includes a plurality of sub-pixels SPix arranged in a matrix. Each sub-pixel SPix includes the TFT element Tr and a liquid crystal element LC. The TFT element Tr includes a thin film transistor. In this example, the TFT element Tr includes an n-channel metal oxide semiconductor (MOS) TFT. A source of the TFT element Tr is coupled to the pixel signal line SGL, a gate thereof is coupled to the scanning signal line GCL, and a drain thereof is coupled to one end of the liquid crystal element LC. One end of the liquid crystal element LC is coupled to the drain of the TFT element Tr, and the other end thereof is coupled to the drive electrode COML.

The sub-pixel SPix is coupled to the other sub-pixel SPix belonging to the same row in the display panel 20 via the scanning signal line GCL. The scanning signal line GCL is coupled to the gate driver 12 (refer to FIG. 1), and receives the scanning signal Vscan supplied from the gate driver 12. The sub-pixel SPix is coupled to the other sub-pixel SPix belonging to the same column in the display panel 20 via the pixel signal line SGL. The pixel signal line SGL is coupled to the source driver 13 (refer to FIG. 1), and receives the pixel signal Vpix supplied from the source driver 13. The sub-pixel SPix is further coupled to the other sub-pixel SPix belonging to the same column via the drive electrode COML. The drive electrode COML is coupled to the drive electrode driver 14 (refer to FIG. 1), and receives the drive signal Vcom supplied from the drive electrode driver 14. That is, in this example, a plurality of sub-pixels SPix belonging to the same column share one drive electrode COML. The drive electrode COML according to the present embodiment extends in parallel with an extending direction of the pixel signal line SGL, and extends in a direction intersecting with an extending direction of the scanning signal line GCL. The extending direction of the drive electrode COML is not limited thereto. For example, the drive electrode COML may extend in a direction parallel to the scanning signal line GCL.

The gate driver 12 illustrated in FIG. 1 drives the scanning signal line GCL to scan each scanning signal line GCL sequentially. The gate driver 12 applies the scanning signal Vscan (refer to FIG. 1) to the gate of the TFT element Tr of the sub-pixel SPix via the scanning signal line GCL to sequentially select one line (one horizontal line) of the sub-pixels SPix as the display driving target. In the display apparatus 1 with a touch detection function, the source driver 13 supplies the pixel signal Vpix to each of the sub-pixels SPix belonging to the selected one horizontal line via a corresponding pixel signal line SGL illustrated in FIG. 12. The sub-pixels SPix perform display in units of horizontal lines in accordance with the pixel signals Vpix to be supplied. In performing this display operation, the drive electrode driver 14 supplies common potential for pixel driving to the drive electrodes COML.

In the color filter 32 illustrated in FIG. 11, for example, color regions of color filters 32R, 32G, and 32B colored in three colors of red (R), green (G), and blue (B) may be periodically arranged. Color regions of three colors R, G, and B are associated, as one set, with each of the sub-pixels SPix illustrated in FIG. 12, and a unit pixel Pix is constituted of a set of sub-pixels SPix corresponding to the color regions of three colors. As illustrated in FIG. 11, the color filter 32 is opposed to the liquid crystal layer 6 in a direction perpendicular to the TFT substrate 21. Another combination of colors may be used for the color filter 32 so long as the colors are different from each other. The combination of colors for the color filter 32 is not limited to three colors. Alternatively, four or more colors may be combined.

The drive electrode COML functions as a common electrode that gives common potential to the pixel electrodes 22 of the display panel 20, and also functions as an electrode to which the drive signal is output in performing mutual capacitance touch detection of the touch panel 30. The drive electrode COML may also function as a detection electrode for performing self capacitance touch detection of the touch panel 30.

Figure 13:
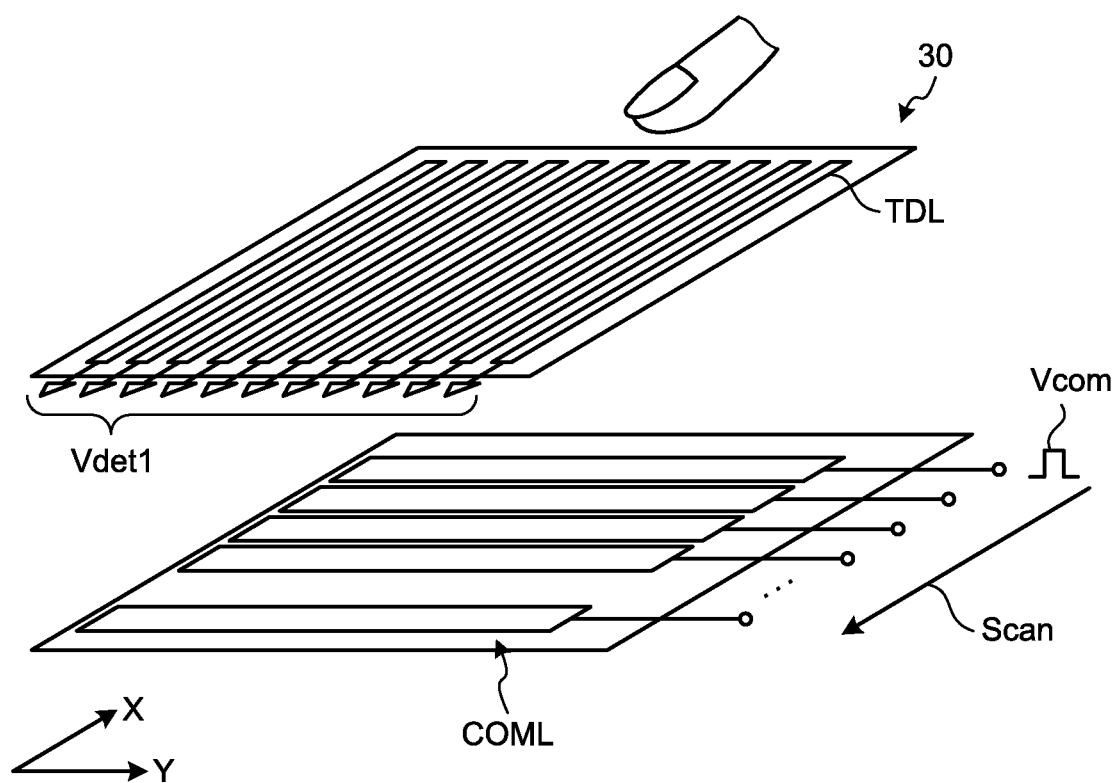
FIG. 13 is a perspective view illustrating a configuration example of an electrode that forms capacitance.

FIG. 13 is a perspective view illustrating a configuration example of an electrode that forms capacitance. The touch panel 30 includes the drive electrode COML provided at the pixel substrate 2 and the first touch detection electrode TDL provided at the counter substrate 3. The drive electrodes COML include a plurality of stripe electrode patterns extending in the Y-direction. The first touch detection electrodes TDL include a plurality of electrode patterns extending in a direction intersecting with the extending direction of the electrode patterns of the drive electrode COML. The first touch detection electrodes TDL are opposed to the drive electrodes COML in a direction perpendicular to the surface of the TFT substrate 21 (refer to FIG. 11). Each electrode pattern of the first touch detection electrodes TDL is coupled to an input side of the amplifier 42 in the first touch detector 40. Capacitance is formed at each intersecting portion between each electrode pattern of the drive electrode COML and each electrode pattern of the first touch detection electrodes TDL.

A translucent conductive material such as indium tin oxide (ITO) is used to make the first touch detection electrode TDL, the drive electrode COML, and the second touch detection electrode STDL, for example. The shape of the electrodes used for touch detection such as the first touch detection electrodes TDL and the drive electrodes COML is not limited to a striped shape. For example, the first touch detection electrodes TDL and the drive electrodes COML may have a comb-teeth shape. Alternatively, it is sufficient that the first touch detection electrodes TDL and the drive electrodes COML are separated from each other such that a plurality of parts are arranged separately, and a slit that separates the drive electrodes COML may have a linear shape or a curved shape. The same applies to the shape of the second touch detection electrode STDL and the drive electrode SCOML.

When the touch panel 30 performs a mutual capacitance touch detection operation, the drive electrode driver 14 drives the drive electrodes COML as a drive electrode block to sequentially scan the drive electrodes COML in a time division manner, so that one detection block of the drive electrodes COML is sequentially selected. When the first touch detection signal Vdet1 is output from the first touch detection electrode TDL, touch detection for one detection block is performed. That is, the drive electrode block corresponds to the drive electrode E1 in the basic principle of mutual capacitance touch detection described above, the first touch detection electrode TDL corresponds to the touch detection electrode E2, and the touch panel 30 detects a touch operation in accordance with the basic principle. As illustrated in FIG. 13, in the touch panel 30, the first touch detection electrodes TDL and the drive electrodes COML intersecting with each other form a capacitance touch sensor in a matrix. Thus, by scanning across the entire touch detection surface of the touch panel 30, a position where an external object is brought into contact with or proximate to the touch panel 30 can be detected.

The touch detection surface of the touch panel 30 also functions as a display surface on which a display output is performed by the display panel 20. The touch detection surface is, for example, a surface of the translucent covering member 5 serving as a cover member, the surface being on a side opposite to the counter substrate 3 side. Thus, the display region 101a on which a display output is performed by the display panel 20 overlaps with a detection region on which touch detection is performed by the touch panel 30. A degree of superimposition between the display region 101a and the detection region is freely predetermined. For example, the detection region preferably covers the entire display region 101a.

In this way, the touch panel 30 includes a plurality of drive electrodes COML arranged in parallel in the detection region, and a plurality of first touch detection electrodes TDL arranged in parallel in the detection region. The first touch detection electrodes TDL are arranged at positions that are not in contact with the drive electrodes COML and at which capacitance is formed between the first touch detection electrode TDL and the drive electrode COML to which the drive signal Vcom is output. With this configuration, touch panel 30 functions as a touch detection device that detects a touch operation in the detection region based on a change in capacitance.

In touch detection in the display region 101a based on the principle described above, the drive electrode COML is driven by the operation of the drive electrode driver 14. Specifically, a switch circuit 110 and a shift register 130 included in the drive electrode driver 14 are formed on the pixel substrate 2.

Figure 14:
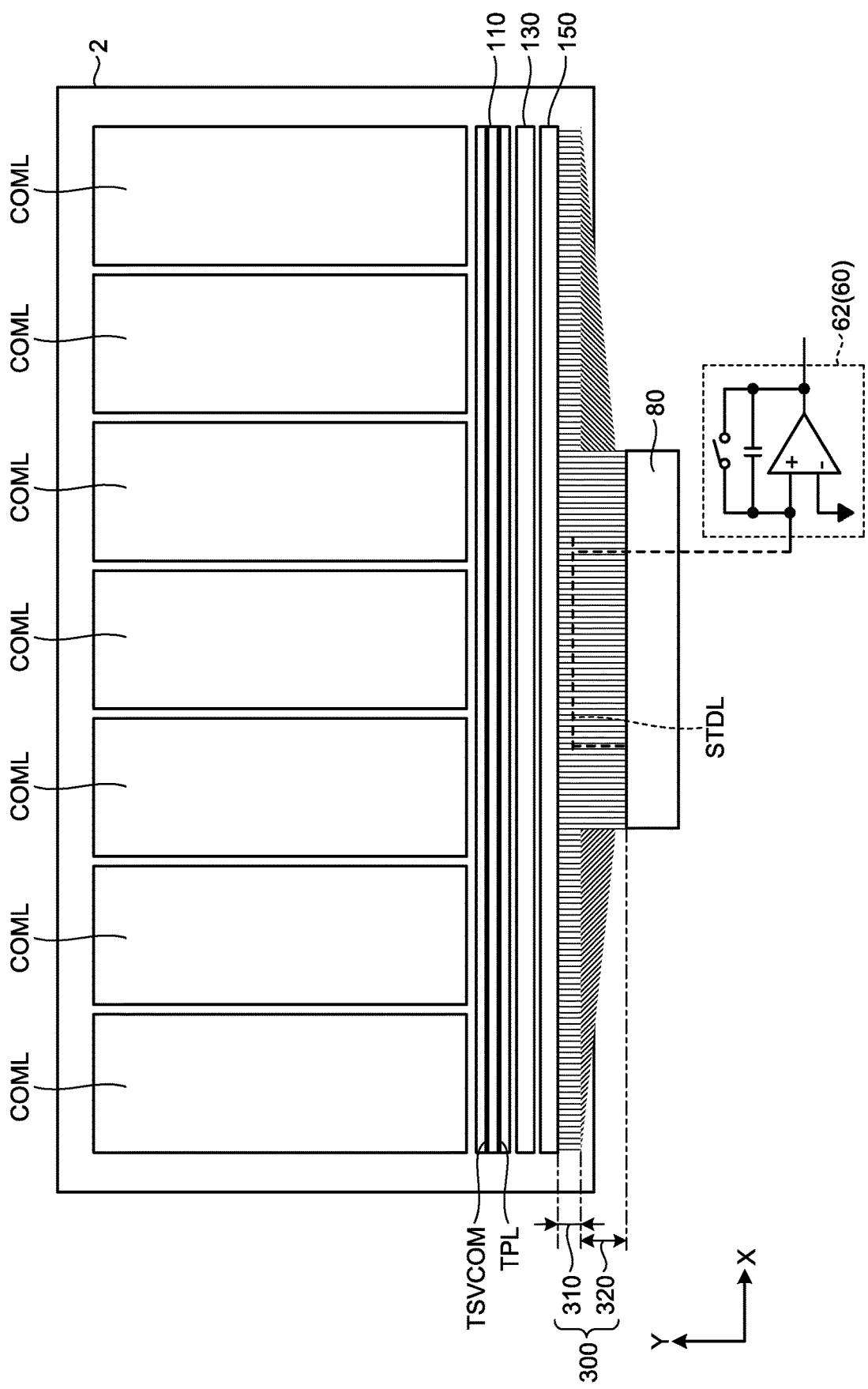
FIG. 14 is a schematic diagram illustrating a relation between a second touch detection electrode and a configuration related to touch detection among configurations formed on or coupled to a pixel substrate.

FIG. 14 is a schematic diagram illustrating a relation between a second touch detection electrode STDL and a configuration related to touch detection among configurations formed on or coupled to the pixel substrate 2. The switch circuit 110 is a circuit that couples one of a potential line TSVCOM and a potential line TPL to the drive electrode COML in a switchable manner. Whether the drive signal Vcom is output to the drive electrode COML or not depends on the switching. Specifically, when the potential line TSVCOM is coupled to the drive electrode COML, the drive signal Vcom is applied to the drive electrode COML. That is, the drive electrode driver 14 according to the present embodiment causes the potential line TSVCOM and the drive electrode COML to be in a coupled state through the switch circuit 110 to output the drive signal Vcom to the drive electrode COML. On the other hand, when the potential line TPL is coupled to the drive electrode COML, the drive signal Vcom is not applied to the drive electrode COML. The switch circuit 110 is configured to switch between a state in which the drive signal Vcom is output to the drive electrode COML and a state in which the drive signal Vcom is not output to the drive electrode COML on a drive electrode COML basis.

The shift register 130 shifts the drive electrode COML to which the drive electrode Vcom is output. Specifically, for example, the shift register 130 causes the switch circuit 110 to operate so that the drive electrode COML to which the drive signal is output is sequentially shifted from one end toward the other end of a direction in which the drive electrodes COML are arranged. Operation of the shift register 130 is controlled, for example, by a display driver integrated circuit (DDIC) 80.

For example, functions related to the controller 11, the gate driver 12, and the source driver 13 are implemented in the DDIC 80. The DDIC 80 is coupled to a flexible printed circuit (FPC) 70 that is provided on a side of the DDIC 80 opposite to the pixel substrate 2 side thereof, and an external signal (for example, the video signal Vdisp and a fingerprint detection implementation signal Vtouch) is transmitted to the DDIC 80 via the FPC 70.

In the present embodiment, the DDIC 80 performs various control operations related to touch detection. Specifically, in touch detection (first touch detection) in the display region 101a, the DDIC 80 causes the drive electrode driver 14 to operate to output the drive signal Vcom to the drive electrode COML and causes the first touch detector 40 to operate, for example. In touch detection (second touch detection) performed in accordance with the fingerprint detection implementation signal Vtouch, the DDIC 80 outputs a signal for driving to outer display region wiring 300 (described later), and causes the second touch detector 60 to operate.

In the present embodiment, as illustrated in FIG. 10 for example, the first touch detector 40 and the second touch detector 60 are arranged on the FPC 70 using what is called a chip on flexible (COF) method. However, this is merely a specific arrangement example of various integrated circuits included in the display apparatus 1 with a touch detection function, and the embodiment is not limited thereto and can be appropriately modified.

Next, the following describes a relation between wiring outside the display region and the second touch detection electrode STDL. The DDIC 80 is electrically coupled to each configuration on the pixel substrate 2 via the outer display region wiring 300 and the switching circuit 150.

The outer display region wiring 300 includes wiring that is electrically coupled to the pixel signal lines SGL and extends to the outside of the display region 101a. Specifically, the outer display region wiring 300 is, for example, wiring that couples the DDIC 80 functioning as the source driver 13 to the pixel signal lines SGL. The outer display region wiring 300 includes pieces of wiring the number of which corresponds to the number of the pixel signal lines SGL. More specifically, the outer display region wiring 300 includes, for example, pixel substrate wiring 310 and extending wiring 320. The pixel substrate wiring 310 includes a plurality of pieces of wiring formed on the pixel substrate 2 and outside the display region 101a of the display panel 20. The wiring included in the pixel substrate wiring 310 is, for example, metal wiring formed in the same layer as that of the pixel signal line SGL, and one end thereof is coupled to the pixel signal line SGL via the switching circuit 150. The extending wiring 320 is, for example, wiring of the FPC. One end of the extending wiring 320 is coupled to the other end of the pixel substrate wiring 310, and the other end of the extending wiring 320 is coupled to the DDIC 80. This configuration couples an output end of the DDIC 80 to an input end of the pixel signal line SGL that is extended to the outside of the display region 101a by the pixel substrate wiring 310.

The outer display region wiring 300 according to the present embodiment includes the pixel substrate wiring 310 and the extending wiring 320. However, this is merely a specific example of the outer display region wiring 300, and the embodiment is not limited thereto. The outer display region wiring 300 may include, for example, only the pixel substrate wiring 310. In this case, the DDIC 80 is formed on the pixel substrate 2 using an implementation method such as a chip on glass (COG) method, for example, and coupled to the other end of the pixel substrate wiring 310.

In FIG. 14 for example, the width of one end of the extending wiring 320 is different from the width of the other end thereof. This configuration merely represents that the extending wiring 320 is formed to converge from the other end of the pixel substrate wiring 310 toward the DDIC 80 because the width of the DDIC 80 is different from the width of a region in which the other end of the pixel substrate wiring 310 is formed (for example, the width along a direction orthogonal to a predetermined direction). A hatched part of the extending wiring 320 illustrated in FIG. 14 and other drawings, the other end of which seems not to be coupled to the DDIC 80, is actually a part in which wiring is formed for electrically coupling the other end of the pixel substrate wiring 310 to the DDIC 80. The hatched part does not represent a decoupled state of the other end of the wiring.

The switching circuit 150 switches between coupling and decoupling of the display device with and from the outer display region wiring 300. Specifically, for example, the switching circuit 150 includes a switch arranged to be interposed between one end of the pixel substrate wiring 310 and the input end of the pixel signal line SGL. The switching circuit 150 operates to switch between coupling (ON) and decoupling (OFF) of one end of the pixel substrate wiring 310 with and from the input end of the pixel signal line SGL in accordance with an ON/OFF operation of the switch. The ON/OFF operation of the switching circuit 150 is performed according to a signal for switching from the DDIC 80, for example, but this is merely an example of operation control of the switching circuit 150. The embodiment is not limited thereto, and can be appropriately modified.

The second touch detection electrode STDL is arranged at a position at which capacitance can be formed between the second touch detection electrode STDL and the outer display region wiring 300. Specifically, as illustrated in FIG. 11 for example, the second touch detection electrode STDL is formed on the polarizing plate 35A side of the covering member 5 to form capacitance between the second touch detection electrode STDL and the pixel substrate wiring 310 on the pixel substrate 2 in accordance with application of the signal for driving to the pixel substrate wiring 310 described later. The capacitance varies depending on a touch operation in the vicinity of a position at which the second touch detection electrode STDL is formed. An output from the second touch detection electrode STDL based on the capacitance functions as a second touch detection signal Vdet2 in the second touch detection.

In the present embodiment, a plurality of pieces of wiring included in the pixel substrate wiring 310 are arranged along a predetermined direction. The second touch detection electrode STDL is arranged as an electrode extending along a direction orthogonal to the predetermined direction. The second touch detection electrodes STDL and a plurality of pieces of wiring included in the pixel substrate wiring 310 are arranged in a grade-separated manner. That is, the second touch detection electrodes STDL and a plurality of pieces of wiring cross but are separated from each other. In FIG. 14, the second touch detection electrodes STDL each have a length such that the second touch detection electrodes STDL cross some pieces of wiring included in the pixel substrate wiring 310. However, the second touch detection electrodes STDL are not limited thereto and may have a length enough to cross all of the pieces of wiring included in the pixel substrate wiring 310.

The outer display region wiring 300 functions as the drive electrode SCOML (refer to FIG. 9) in the second touch detection. Specifically, for example, the DDIC 80 outputs the signal for driving to the outer display region wiring 300 in accordance with the fingerprint detection implementation signal Vtouch. The fingerprint detection implementation signal Vtouch is input from the outside when a signal to be a trigger for performing the second touch detection is obtained, for example. As a specific example, when the DDIC 80 transmits the first touch detection signal Vdet1 to an external device to which the display apparatus 1 with a touch detection function is coupled, the external device outputs the fingerprint detection implementation signal Vtouch to the display apparatus 1 with a touch detection function based on a touch detection result indicated by the first touch detection signal Vdet1. Accordingly, the second touch detection is performed. The signal for driving that is output from the DDIC 80 to the outer display region wiring 300 functions as the drive signal Vcom in touch detection performed by the second touch detector 60. The touch detection performed by the second touch detector 60 is touch detection based on a change in capacitance formed between the second touch detection electrode STDL and the outer display region wiring 300 (for example, the pixel substrate wiring 310). The second touch detector 60 performs touch detection based on the second touch detection signal Vdet2 output from the second touch detection electrode STDL based on the capacitance. When functioning as the source driver 13, the DDIC 80 outputs the pixel signal Vpix to the sub-pixel SPix via the outer display region wiring 300, the switching circuit 150, and the pixel signal line SGL. In this way, the second touch detector 60 functions as a touch detection device that performs touch detection based on the capacitance formed between the outer display region wiring 300 and the second touch detection electrode STDL. The capacitance formed in the second touch detection is formed when the touch detection signal (signal for driving) is output to the signal line in touch detection (second touch detection) by a circuit (DDIC 80) having a function of outputting the pixel signal Vpix.

Figure 15:
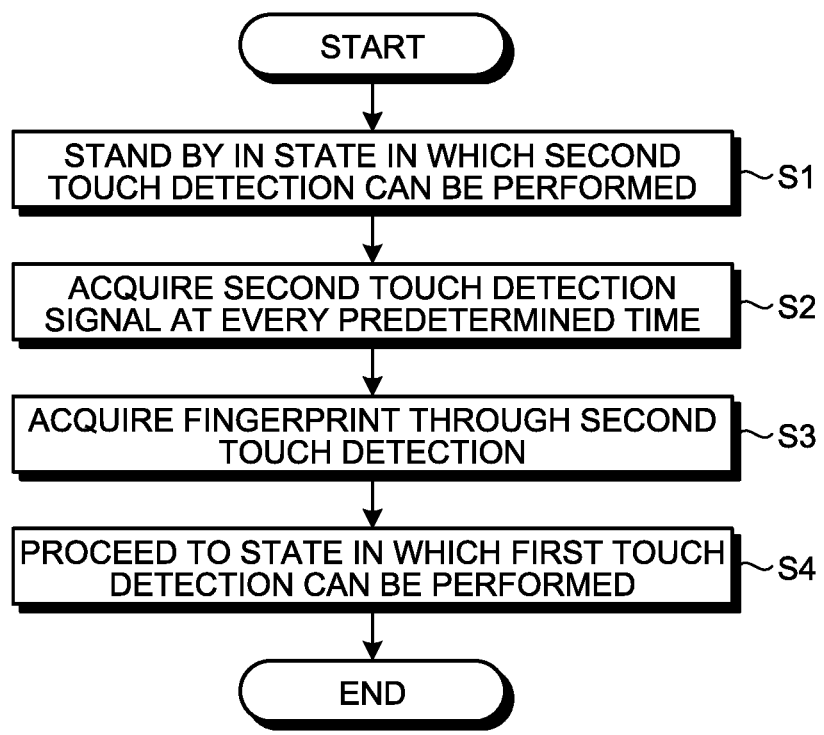
FIG. 15 is a flowchart illustrating an example of a processing procedure in a case in which second touch detection is performed.

FIG. 15 is a flowchart illustrating an example of a processing procedure in a case in which the second touch detection is performed. Specifically, FIG. 15 is a flowchart illustrating a procedure of resuming processing. The resuming processing is processing for causing the display apparatus 1 with a touch detection function to be shifted from a standby state to a display output operating state. For example, in a case in which fingerprint detection using the second touch detection is performed, the resuming processing is performed. In this case, as the display apparatus 1 with a touch detection function is caused to be in the standby state, the fingerprint detection implementation signal Vtouch is input from the outside. The display output operating state is assumed to be a state in which the first touch detection can be performed, for example.

The DDIC 80 causes the display apparatus 1 with a touch detection function to be in a stand-by state while keeping a state in which the second touch detection can be performed (Step S1). When a sweep operation of a finger is started on the second touch detection electrode STDL in this state, the second touch detection signal Vdet2 indicating proximity or contact of the finger is output from the second touch detection electrode STDL. When the second touch detection signal Vdet2 is acquired at every predetermined time (Step S2), roughness of the fingerprint indicated by a second touch detection result (for example, refer to FIG. 9) can be obtained (Step S3). Subsequently, the DDIC 80 causes the display apparatus 1 with a touch detection function to be in a state of being able to perform the first touch detection (Step S4).

In the present embodiment, the DDIC 80 turns ON the switching circuit 150 when the display panel 20 operates, and turns OFF the switching circuit 150 when the second touch detection is performed. That is, the DDIC 80 turns ON the switching circuit 150 when the pixel signal Vpix is output, and couples the outer display region wiring 300 to the pixel signal line SGL. Accordingly, each of the pixel signals Vpix is transmitted to a corresponding one of the sub-pixels SPix. On the other hand, the DDIC 80 turns OFF the switching circuit 150 in the second touch detection, and decouples the outer display region wiring 300 from the pixel signal line SGL. The DDIC 80 may turn OFF the switching circuit 150 in the first touch detection. Due to this, influence of coupling capacitance between the source and the drain of the TFT element Tr on the touch detection can be suppressed more securely.

In the present embodiment, the pixel substrate wiring 310 in the outer display region wiring 300 is used as the drive electrode SCOML. Alternatively, the extending wiring 320 may be used as the drive electrode SCOML. When the extending wiring 320 is used as the drive electrode SCOML, the display apparatus 1 with a touch detection function preferably has a configuration in which the capacitance formed between the second touch detection electrode STDL and the extending wiring 320 is easily stabilized. For example, the display apparatus 1 with a touch detection function may have a configuration in which the position of the extending wiring 320 with respect to the second touch detection electrode STDL is fixed. The position of the second touch detection electrode STDL may be any position at which capacitance is formed between itself and the outer display region wiring 300, and a specific position thereof can be appropriately modified.

FIGS. 16 and 17 are diagrams illustrating an arrangement example of the second touch detection electrode STDL. FIGS. 16 and 17 illustrate a configuration example in a case in which the outer display region wiring 300 and the DDIC 80 are implemented on the pixel substrate 2. That is, in FIGS. 16 and 17, the entire outer display region wiring 300 formed on the insulating layer 24 is the pixel substrate wiring 310. The second touch detection electrode STDL may be formed on the polarizing plate 35A side of the covering member 5 as illustrated in FIGS. 11 and 16, or may be formed on an insulating layer 25 on the pixel substrate 2 as illustrated in FIG. 17. In the configuration illustrated in FIG. 17, the covering member 5 is not interposed between the second touch detection electrode STDL and a finger, so that sensitivity of the second touch detection can be enhanced more easily. The second touch detection electrode STDL may be formed in the same layer as that of the first touch detection electrode TDL, or may be formed in other layers so long as the second touch detection electrode STDL is arranged to intersect with the pixel substrate wiring 310. In the second touch detector 60 illustrated in FIG. 14, for example, the integrating circuit included in the amplifier 62 is illustrated to clarify a relation with respect to the basic principle of touch detection described above with reference to FIG. 3 and the other drawings. However, the specific configuration of the second touch detector 60 is as described above with reference to FIG. 8.

As described above, according to the present embodiment, the second touch detection electrode STDL forms capacitance between the second touch detection electrode STDL and the outer display region wiring 300 including the wiring that is electrically coupled to the pixel signal line SGL and extends to the outside of the display region 101a, and the second touch detector 60 performs the second touch detection based on the capacitance. Thus, the outer display region wiring 300 includes wiring that is arranged for inputting the pixel signal Vpix from the outside of the display apparatus to the pixel signal line SGL included in the display apparatus, and therefore can be used as a configuration related to the second touch detection. Accordingly, the display apparatus and the configuration related to touch detection can share the same configuration, so that the number of components of the display apparatus 1 with a touch detection function can be easily reduced. The configuration related to the second touch detection can be integrated with the display apparatus, so that the thickness of the display apparatus 1 with a touch detection function can be easily reduced.

The switching circuit 150 is provided for switching between coupling and decoupling of the display device with and from the outer display region wiring 300, so that the pixel signal line SGL is excluded from a portion in which the signal for driving is transmitted, and the length of wiring for transmitting the signal for driving is shorten. Accordingly, electric potential of the signal for driving that causes the pixel substrate wiring 310 to function as the drive signal SCOML can be suppressed.

The capacitance between the outer display region wiring 300 and the second touch detection electrode STDL is used when the signal (signal for driving) used in performing touch detection is output to the pixel signal line SGL by the circuit (for example, the DDIC 80). Therefore the configuration of outputting the pixel signal Vpix can be used as the configuration of outputting the signal for driving used in touch detection.

The touch panel 30 for detecting a touch operation in the display region 101a is provided, so that both of touch detection in the display region 101a and touch detection outside the display region 101a can be performed.

The following describes a modification and other embodiments of the present invention. The modification and the other embodiments have the same configuration as that of the first embodiment unless specifically described.

Modification

Figure 18:
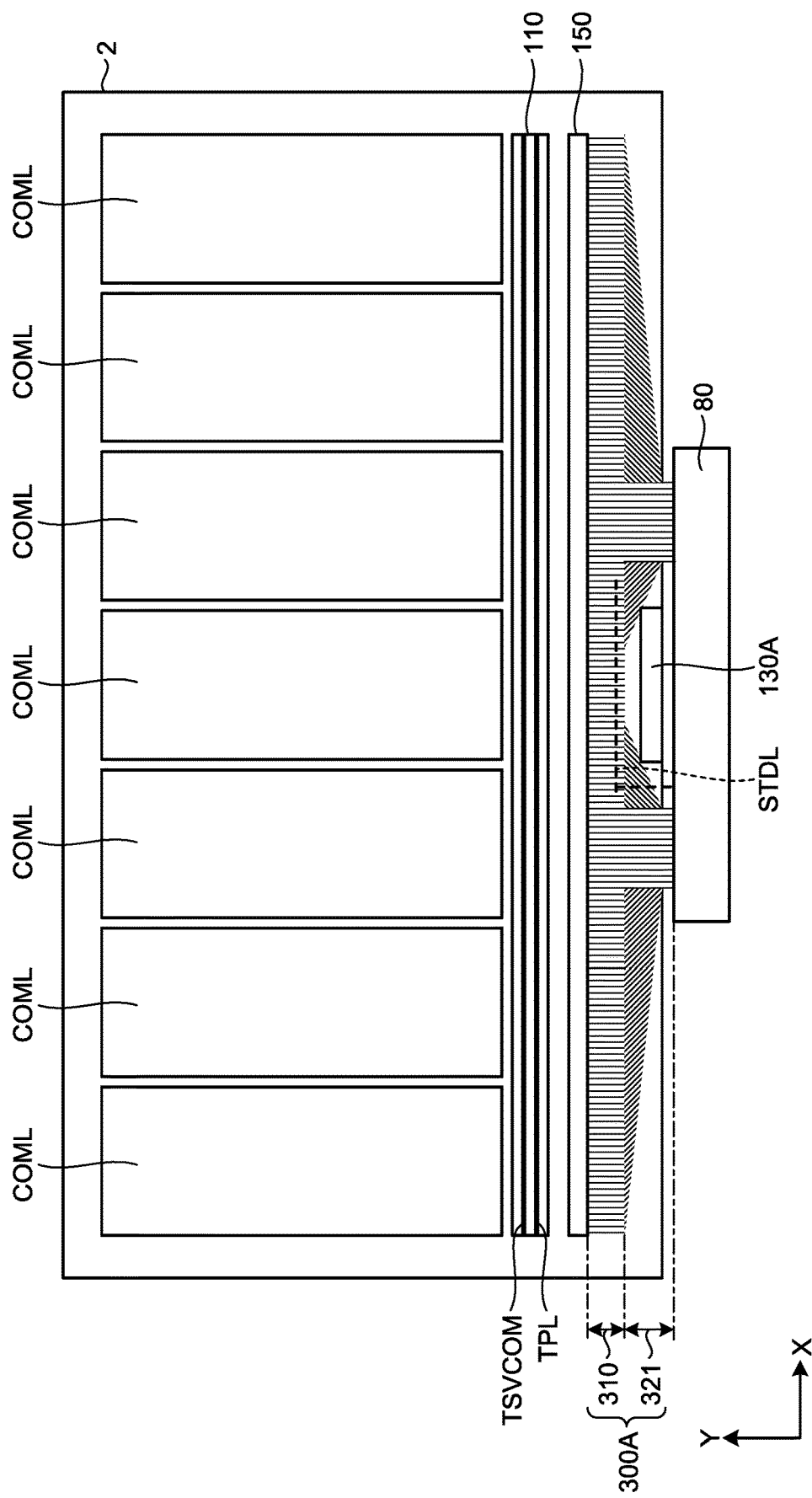
FIG. 18 is a diagram illustrating a modification of the embodiment.

FIG. 18 is a diagram illustrating a modification of the embodiment. A specific form of the outer display region wiring 300 is not limited to the embodiment exemplified in FIG. 14, and can be appropriately modified. For example, as illustrated in FIG. 18, an extending direction of the wiring of the outer display region wiring 300A may be a direction corresponding to another configuration formed on the pixel substrate 2.

Specifically, in the modification, a shift register 130A is arranged to be closer to the outside of the display region than the switching circuit 150 is. Thus, in the modification, wiring of extending wiring 321 is extended to avoid a mounted position of the shift register 130A. The shift register 130A is coupled to the switch circuit 110 via relay wiring formed in a layer different from that of the pixel substrate wiring 310.

Second Embodiment

Figure 19:
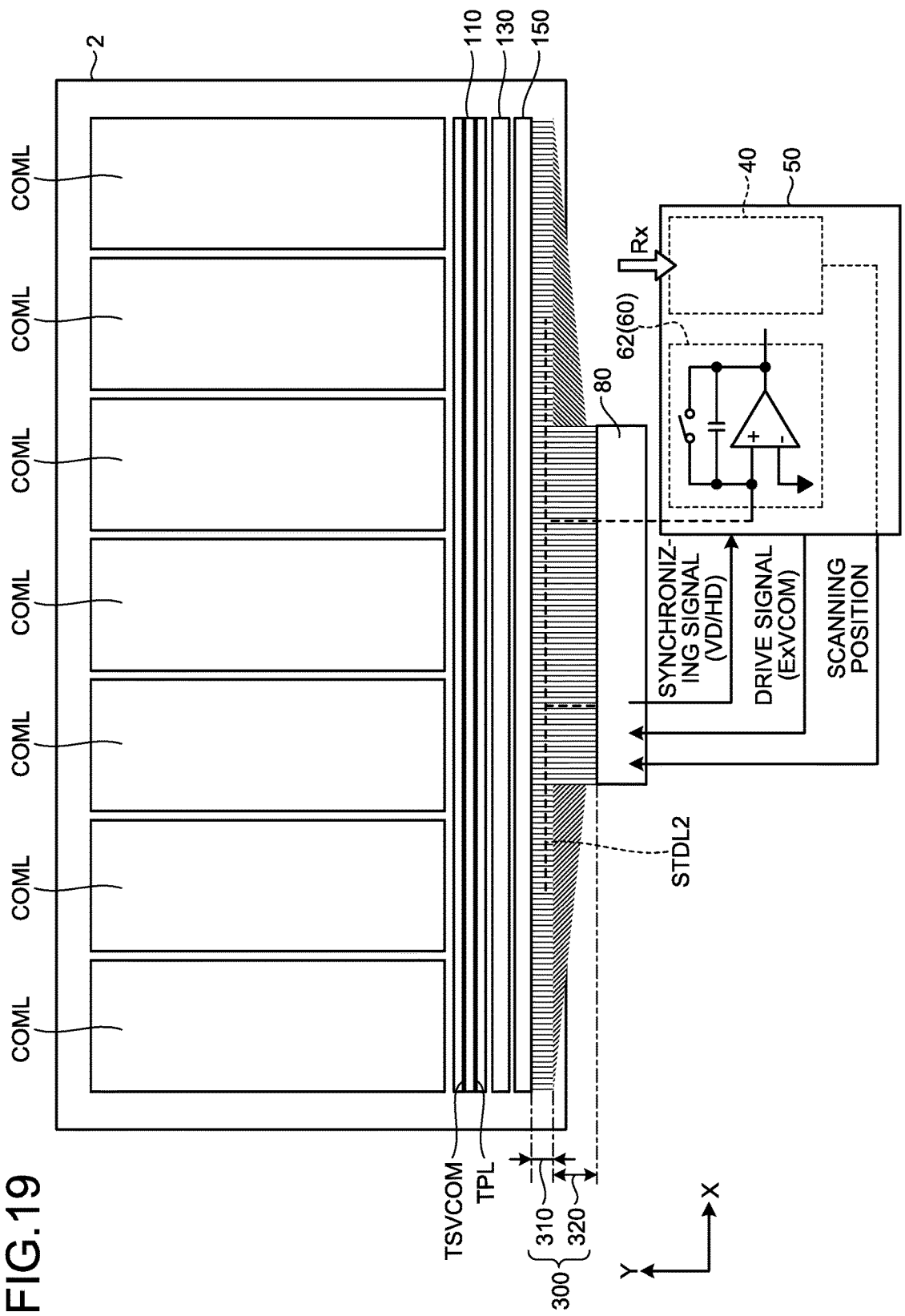
FIG. 19 is a schematic diagram illustrating a relation between a second touch detection electrode and a configuration related to touch detection among configurations formed on or coupled to a pixel substrate according to a second embodiment.

FIG. 19 is a schematic diagram illustrating a relation between the second touch detection electrode STDL2 and a configuration related to touch detection among configurations formed on or coupled to the pixel substrate 2 according to a second embodiment. In the second embodiment, the first touch detector 40 and the second touch detector 60 are combined into one circuit (combined circuit 50). Due to this, a touch detection result obtained through the first touch detection and a touch detection result obtained through the second touch detection can be mutually used more easily.

Specifically, for example, in performing the second touch detection in accordance with the fingerprint detection implementation signal Vtouch, the combined circuit 50 performs the first touch detection first using a function of the first touch detector 40 before the second touch detection. FIG. 19 illustrates an arrow Rx indicating an electrical signal generated in the first touch detection and input to the combined circuit 50. When a touch operation performed by a human finger is detected in the first touch detection, the combined circuit 50 performs the second touch detection using a function of the second touch detector 60.

More specifically, the combined circuit 50 outputs a drive signal ExVCOM to the DDIC 80, for example. For example, the drive signal ExVCOM is a signal indicating a timing at which touch detection is performed and also indicating whether the touch detection to be performed is the first touch detection or the second touch detection. Hereinafter, the timing at which touch detection is performed is referred to as a detection timing. With the output of the drive signal ExVCOM, the combined circuit 50 outputs, to the DDIC 80, information indicating wiring among the outer display region wiring 300 as a target to which the signal for driving is output in the second touch detection. The information may be, for example, information included in the drive signal ExVCOM or information indicated by an independent signal. The wiring among the outer display region wiring 300 as a target to which the signal for driving is output means, for example, wiring that is arranged in a region covered by the second touch detection electrode STDL2 and arranged in a portion corresponding to a position in the X-direction of a finger specified in the first touch detection performed before the second touch detection. Hereinafter, the wiring as a target to which the signal for driving is output is referred to as target wiring, in some cases.

The combined circuit 50 outputs, to the DDIC 80, the drive signal ExVCOM indicating that the first touch detection is performed in accordance with the fingerprint detection implementation signal Vtouch. The DDIC 80 causes the drive electrode driver 14 to operate based on the drive signal ExVCOM, and causes the drive electrode driver 14 to output the drive signal Vcom to the drive electrode COML. The combined circuit 50 performs the first touch detection with the first touch detector 40. Thereafter, based on the position in the X-direction among positions of a finger indicated by the detection result of the first touch detection, the combined circuit 50 outputs, to the DDIC 80, information indicating the target wiring among the outer display region wiring 300. The DDIC 80 outputs the signal for driving to the target wiring among the outer display region wiring 300. The second touch detector 60 performs the second touch detection assuming that the signal for driving is output to the target wiring of the outer display region wiring 300 indicated by the information.

Accordingly, the position of the finger obtained in the first touch detection can be followed by the portion in which the second touch detection is performed.

Figure 20:
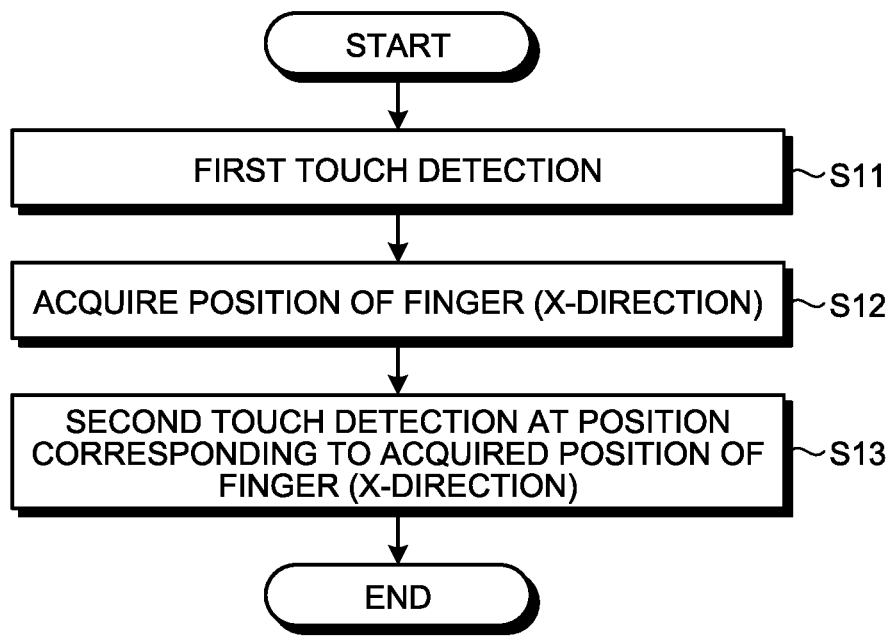
FIG. 20 is a flowchart illustrating an example of a processing procedure in a case in which second touch detection is performed after first touch detection.

FIG. 20 is a flowchart illustrating an example of a processing procedure in a case in which the second touch detection is performed after the first touch detection. The combined circuit 50 performs the first touch detection (Step S11), and acquires information indicating the position in the X-direction from among the positions of the finger obtained in the first touch detection through the process at Step S11 (Step S12). The combined circuit 50 outputs the signal for driving to the wiring (target wiring) of the outer display region wiring 300 arranged in a portion corresponding to the position in the X-direction obtained at Step S12, and performs the second touch detection in the portion corresponding to the position in the X-direction (Step S13).

To illustrate a configuration for performing the second touch detection corresponding to the position in the X-direction of the finger specified in the first touch detection more easily, FIG. 19 illustrates the second touch detection electrode STDL2 having the length in the longitudinal direction greater than that of the second touch detection electrode STDL illustrated in FIG. 14. However, the length of the second touch detection electrode is arbitrary in the respective embodiments. Also in the second embodiment, the signal for driving may be output to all pieces of wiring crossing the second touch detection electrode STDL among the pieces of wiring in the outer display region wiring 300.

In the second embodiment, the detection timing of touch detection alternates with a display output timing in the display panel 20. Specifically, for example, a synchronizing signal (VD/HD) output from the DDIC 80 in display output of each frame is transmitted to the combined circuit 50. In this case, VD represents a signal (vertical synchronizing signal) indicating synchronization related to driving in a vertical direction of the display panel 20, and HD represents a signal (horizontal synchronizing signal) indicating synchronization related to driving in a horizontal direction of the display panel 20. The combined circuit 50 causes the first touch detector 40 to operate in accordance with a completion timing of the display output of each frame obtained from the synchronizing signal, and outputs the drive signal ExVCOM. The DDIC 80 causes the drive electrode driver 14 to operate based on the drive signal ExVCOM, and causes the drive electrode driver 14 to output the drive signal Vcom to the drive electrode COML. Accordingly, the first touch detection is performed at a timing after the display output is completed.

The DDIC 80 performs display output of a subsequent frame in accordance with the completion timing of touch detection obtained from the drive signal ExVCOM. Thereafter, the combined circuit 50 may further perform the first touch detection, or perform the second touch detection in accordance with the position of the finger specified in the immediately preceding first touch detection. Such a relation between the display output timing and the detection timing of touch detection may be the same in the other embodiments such as the first embodiment and the modification thereof.

Third Embodiment

Figure 21:
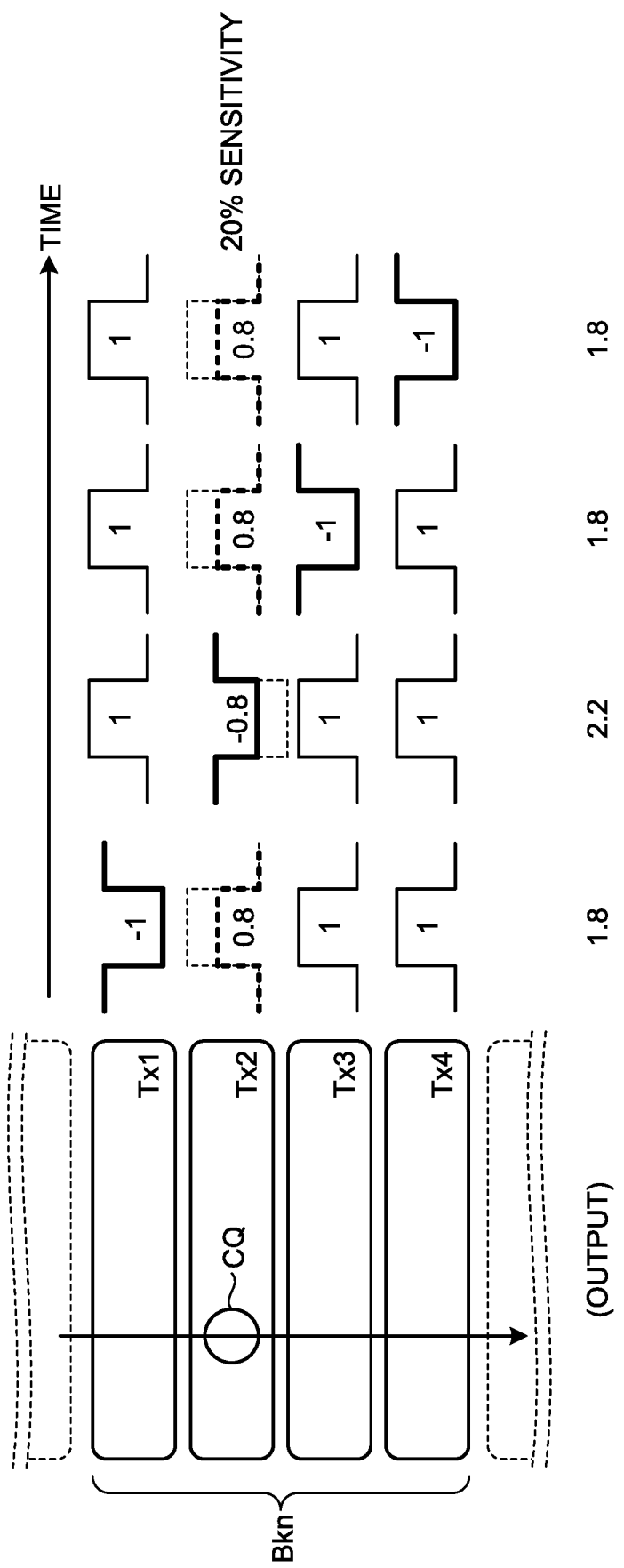
FIG. 21 is an explanatory diagram for explaining an example of driving in a code division multiplex system.

FIG. 21 is an explanatory diagram for explaining an example of driving in a code division multiplex system. In the first embodiment described above, for example, exemplified is a case in which the drive electrode COML is individually driven. However, a method for driving the drive electrode COML is not limited thereto. Specifically, as illustrated in FIG. 21 for example, in the display apparatus 1 with a touch detection function, the drive electrode driver 14 selects a plurality of (in the example of FIG. 21, four) drive electrode blocks Tx1, Tx2, Tx3, and Tx4 in a selected drive electrode block Bkn at the same time to supply the drive signal Vcom, the phase of the drive signal Vcom being determined based on a predetermined code. In FIG. 21, waveforms illustrated on the right side of the drive electrode blocks Tx1, Tx2, Tx3, and Tx4 each exemplify the phase of the drive signal Vcom. For example, the predetermined code is defined with a square matrix represented by the following expression (1). A degree of the square matrix of the expression (1) is four, which is the number of the drive electrode blocks Tx1, Tx2, Tx3, and Tx4 in the selected drive electrode block Bkn. A diagonal component "−1" in the square matrix of the expression (1) is different from a component "1" other than the diagonal component in the square matrix. The code "−1" is a code (negative code) for supplying the drive signal Vcom the phase of which is determined to be different from the code (positive code) of "1". The drive electrode driver 14 and the like transmit the drive signal Vcom based on the square matrix in the expression (1) so that a first phase and a second phase are reversed. The first phase is a phase of the AC rectangular wave Sg described above corresponding to the component "1" other than the diagonal component in the square matrix, and the second phase is a phase of the AC rectangular wave Sg described above corresponding to the diagonal component "−1" in the square matrix. Each of the drive electrode blocks Tx1, Tx2, Tx3, and Tx4 includes a predetermined number of drive electrodes COML.

$$\begin{pmatrix} -1 & 1 & 1 & 1 \\ 1 & -1 & 1 & 1 \\ 1 & 1 & -1 & 1 \\ 1 & 1 & 1 & -1 \end{pmatrix} \begin{pmatrix} 1.8 \\ 2.2 \\ 1.8 \\ 1.8 \end{pmatrix} = \begin{pmatrix} 4.0 \\ 3.2 \\ 4.0 \\ 4.0 \end{pmatrix} \quad (1)$$

In the third embodiment, a plurality of drive electrode blocks Tx1, Tx2, Tx3, and Tx4 are driven at the same time like the selected drive electrode block Bkn exemplified above, and detection is performed using a code division multiplex (CDM) system.

For example, when an external proximity object CQ such as a finger is present at the drive electrode block Tx2, which is the second position from an upstream side of scanning in the drive electrode blocks Tx1, Tx2, Tx3, and Tx4 in the selected drive electrode block Bkn, a difference voltage is caused by the external proximity object CQ due to mutual induction (for example, the difference voltage is assumed to be 20%). In such an example, the second touch detection signal Vdet2 (sensor output signal) detected by the second touch detector 60 at the first timing (first time zone) is represented as (−1)+(0.8)+(1)+(1)=1.8. In the expression, "1.8" is signal intensity based on the signal intensity of the drive signal Vcom of the code "1". The second touch detection signal Vdet2 detected by the second touch detector 60 at a timing subsequent to the first time zone (second time zone) is represented as (1)+(−0.8)+(1)+(1)=2.2. The second touch detection signal Vdet2 detected by the second touch detector 60 at a timing subsequent to the second time zone (third time zone) is represented as (1)+(0.8)+(−1)+(1)=1.8. The second touch detection signal Vdet2 detected by the second touch detector 60 at a timing subsequent to the third time zone (fourth time zone) is represented as (1)+(0.8)+(1)+(−1)=1.8.

The coordinate extractor 65 according to the third embodiment multiplies the second touch detection signals Vdet2 (sensor output signals) detected by the signal processor 64 using the square matrix of the expression (1). The coordinate extractor 65 detects that there is the external proximity object CQ such as a finger at the position of the drive electrode block Tx2 in the selected drive electrode block Bkn with detection sensitivity having higher accuracy (for example, four times) than that of time division multiplex (TDM) driving without increasing the voltage of the signal output as the drive signal Vcom.

In the example with reference to FIG. 21, described is the CDM system using four drive electrode blocks Tx1, Tx2, Tx3, and Tx4 for convenience. However, the number of drive electrode blocks driven at the same time in the CDM system is arbitrary. The CDM system can be applied to both of the first touch detection and the second touch detection.

Figure 22:
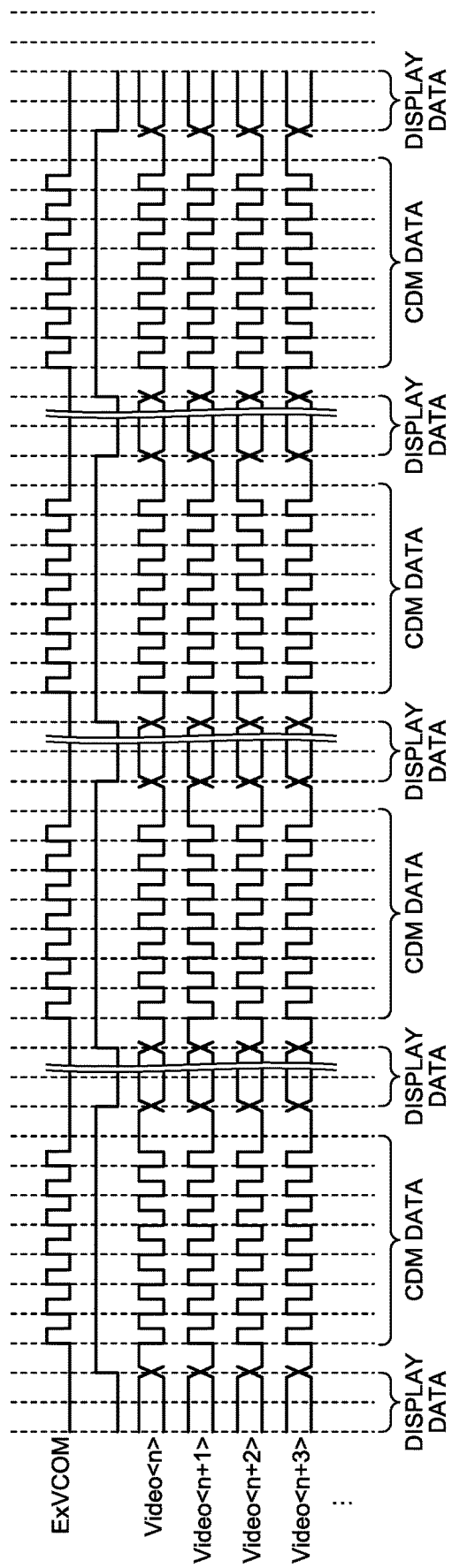
FIG. 22 is a timing chart illustrating an example of a relation between a drive signal ExVCOM in the code division multiplex system and drive signals Vcom output to a plurality of targets.

FIG. 22 is a timing chart illustrating an example of a relation between the drive signal ExVCOM in the CDM system and drive signals Vcom output to a plurality of targets. In FIG. 22, targets to be driven in the CDM system (the drive electrodes COML or the wiring among the outer display region wiring 300) are represented as Video<n>, Video<n+1>, Video<n+2>, Video<n+3>, . . . along an arrangement direction.

In the CDM system, the drive signal Vcom (or the signal for driving) is output, in the same phase as that of the drive signal ExVCOM, to the drive electrode COML (or the wiring) to be driven to indicate a positive code. On the other hand, the drive signal Vcom (or the signal for driving) is output, in a phase opposite to that of the drive signal ExVCOM, to the drive electrode COML (or the wiring) to be driven to indicate a negative code. FIG. 22 illustrates an example in which a target to be driven to indicate the negative code is shifted in order of Video<n>, Video<n+1>, Video<n+2>, Video<n+3>, . . . in each touch detection operation that is performed alternately with the display output, and the other targets are driven to indicate the positive code. The number of targets to be driven to indicate the negative code at the same time is not limited to one.

FIG. 23 is a table illustrating an example of a relation between the target to which the positive code (P) is added and the target to which the negative code (N) is added at the same time in the CDM system. FIG. 23 exemplifies a case in which the number of targets (the drive electrode COML or the wiring of the outer display region wiring 300) to be driven at the same time in touch detection is 64. However, this is merely an example, and the embodiment is not limited thereto. In the description with reference to FIG. 23, the detection timing of touch detection corresponding to a timing of a number (t: 1 to 12) described in the "time" column is represented as a "detection timing (t)".

For example, all targets (1 to 64) are driven to indicate the positive code at the first detection timing (1). At the next detection timing (2), a half of the targets on an upstream side (1 to 32) are driven to indicate the positive code, and a half of the targets on a downstream side (33 to 64) are driven to indicate the negative code. Thereafter, at the detection timing (3), the targets are driven to individually switch between the positive code and the negative code on a group by group basis, the groups (1 to 16, 17 to 32, 33 to 48, and 49 to 64) being obtained by dividing all the targets into quarters in such a manner that a quarter of all targets is selected sequentially from the upstream side. Specifically, the targets (1 to 16, and 33 to 48) are driven to indicate the positive code, and the targets (17 to 32, and 49 to 64) are driven to indicate the negative code. Thereafter, at the detection timing (4), the targets are driven such that a positive/negative relation of the code between a group positioned on the most downstream side and a group positioned on the upstream side thereof is reversed between the detection timing (4) and the immediately preceding detection timing (3). Specifically, the targets (1 to 16, 49 to 64) are driven to indicate the positive code, and the targets (17 to 48) are driven to indicate the negative code. In this case, the targets (17 to 48) are obtained by combining the targets (17 to 32) and the targets (33 to 48).

Thereafter, at the detection timing (5), the targets are driven to individually switch between the positive code and the negative code on a group by group basis, the groups (1 to 8, 9 to 16, 17 to 24, 25 to 32, 33 to 40, 41 to 48, 49 to 56, and 57 to 64) being obtained by dividing all the targets into 8 equal groups in such a manner that one-eighth of all targets is selected sequentially from the upstream side. Specifically, the targets (1 to 8, 17 to 24, 33 to 40, and 49 to 56) are driven to indicate the positive code, and the targets (9 to 16, 25 to 32, 41 to 48, and 57 to 64) are driven to indicate the negative code.

Thereafter, at the detection timing (6), the targets are driven such that the positive/negative relation of the code between a group positioned on the most downstream side and a group positioned on the upstream side thereof is reversed between the detection timing (6) and the immediately preceding detection timing (5). Specifically, the targets (1 to 8, 17 to 24, 41 to 48, and 57 to 64) are driven to indicate the positive code, and the targets (9 to 16, 25 to 40, and 49 to 56) are driven to indicate the negative code.

Thereafter, at the detection timing (7), the targets are driven such that the positive/negative relation of the code between a group positioned on the upstream side of two groups regarded as replacement targets at the previous detection timing and a group positioned on a further upstream side thereof is reversed between at the detection timing (7) and the immediately preceding detection timing (6). Specifically, the targets (1 to 8, 25 to 40, and 57 to 64) are driven to indicate the positive code, and the targets (9 to 24, and 41 to 56) are driven to indicate the negative code.

Thereafter, at the detection timing (8), the targets are driven such that the positive/negative relation of the code between a group positioned on the most downstream side and a group positioned on the upstream side thereof is reversed between the detection timing (8) and the immediately preceding detection timing (7). Specifically, the targets (1 to 8, 25 to 32, and 41 to 56) are driven to indicate the positive code, and the targets (9 to 24, 33 to 40, 57 to 64) are driven to indicate the negative code.

In this way, in the CDM system, for example, the number of targets included in a group as a unit of switching the positive/negative relation of the code is reduced as the detection is continued. In addition, a group of targets positioned on the most upstream side is fixed at one code, and a positive/negative pattern of the code of the other groups can be switched so that the positive/negative pattern of the other groups can be replaced with each other preferentially from the downstream side in order. At the detection timings (9) to (12), the positive code and the negative code are individually switched to each other on a group by group basis, the groups being obtained by dividing all the targets into 16 equal groups. Although not illustrated, at the detection timing (13) and subsequent timings, grouping and switching of the code can be performed with a similar mechanism. In FIG. 23, the group on the most upstream side is fixed at the positive code. Alternatively, the group on the most upstream side may be fixed at the negative code. A relation between the target to which the positive code is added and the target to which the negative code is added as illustrated in FIG. 23 may be reversed.

As described above, according to the third embodiment, sensitivity of the second touch detection is further enhanced. In particular, in the second touch detection, the arrangement pitch of the targets to be driven tends to be finer than that in the first touch detection, so that a degree of electrical change based on capacitance generated in accordance with the drive signal Vcom to one target, that is, a degree of electrical change in capacitance corresponding to presence/absence of a touch operation tends to be smaller. Thus, difficulty in securing sensitivity of touch detection is increased in the second touch detection. Under such a condition, by employing the CDM system for the second touch detection, sufficient sensitivity can be easily secured.

The preferred embodiments of the present invention and the modification thereof (embodiments and the like) have been described above. However, the present invention is not limited thereto. Content disclosed in the embodiments and the like is merely an example, and various modifications can be made without departing from the gist of the invention. The present invention naturally encompasses an appropriate modification maintaining the gist of the invention.

Figure 24:
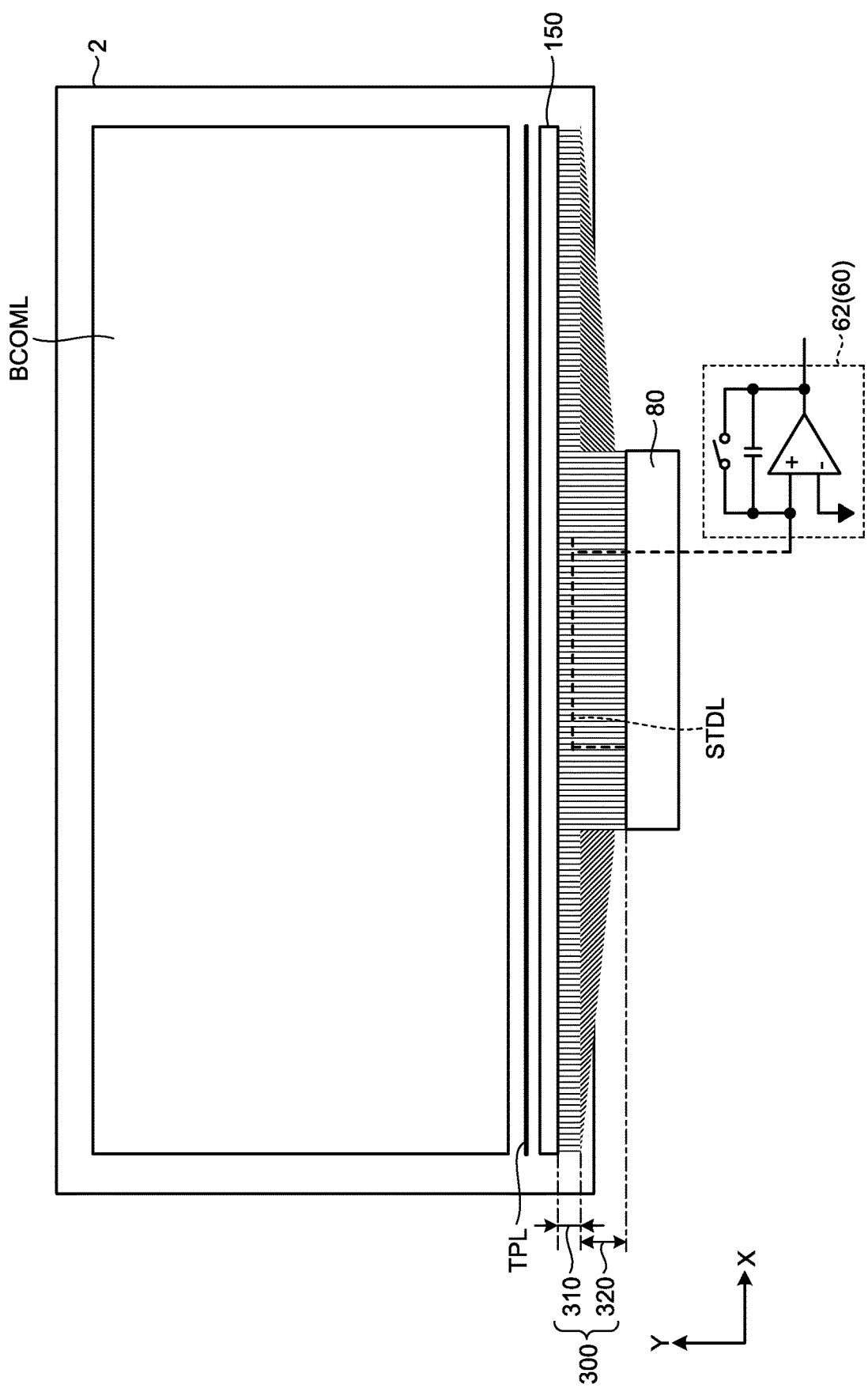
FIG. 24 is a schematic diagram illustrating an example of a configuration of a display apparatus that does not include a configuration related to the first touch detection and includes a configuration related to the second touch detection.

FIG. 24 is a schematic diagram illustrating an example of a configuration of a display apparatus that does not include a configuration related to the first touch detection and includes a configuration related to the second touch detection. The configuration related to the first touch detection, that is, the configuration related to touch detection in the display region 101*a* can be omitted. When the configuration related to touch detection in the display region 101*a* is omitted, as illustrated in FIG. 24, the drive electrodes COML arranged in the above embodiments are replaced with a film-like or plate-like electrode BCOML continuous across the entire display region. The configuration of the drive electrode driver 14 used for the first touch detection is also omitted. Specifically, the switch circuit 110, the shift register 130, and the potential line TSVCOM are omitted. The electrode BCOML is, for example, provided as a constant potential electrode electrically coupled to the potential line TPL.

Figure 25:
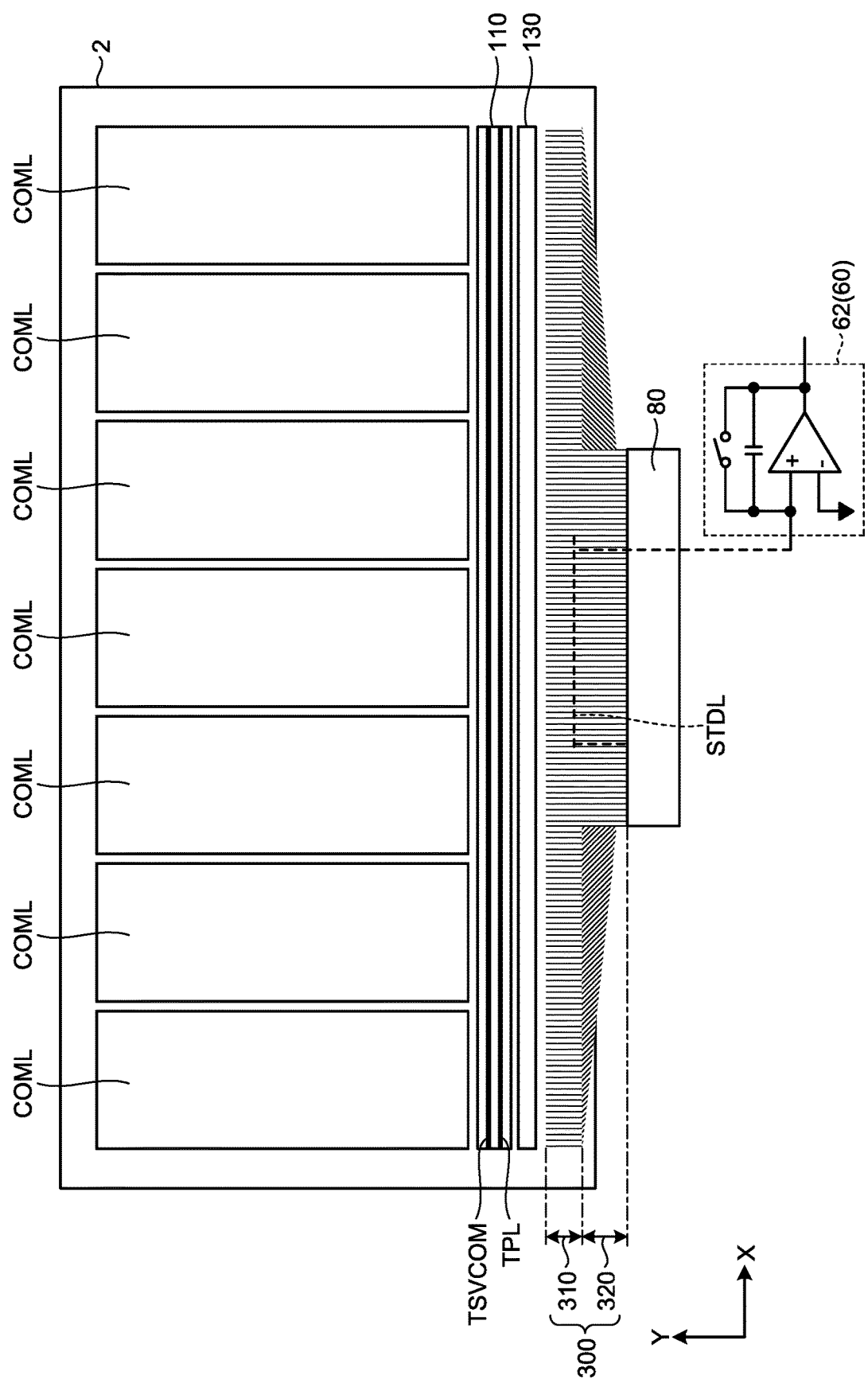
FIG. 25 is a schematic diagram illustrating an example of a configuration from which a switching circuit is omitted.

FIG. 25 is a schematic diagram illustrating an example of a configuration from which the switching circuit 150 is omitted. In the second touch detection, the outer display region wiring 300 is not necessarily decoupled from the pixel signal line SGL by the switching circuit 150. As illustrated in FIG. 25, the switching circuit 150 can be omitted. In this case, the scanning signal Vscan is not output at a timing when the signal for driving for the second touch detection is output to the outer display region wiring 300, and all horizontal lines are caused to be in a non-selected (OFF) state.

Figure 26:
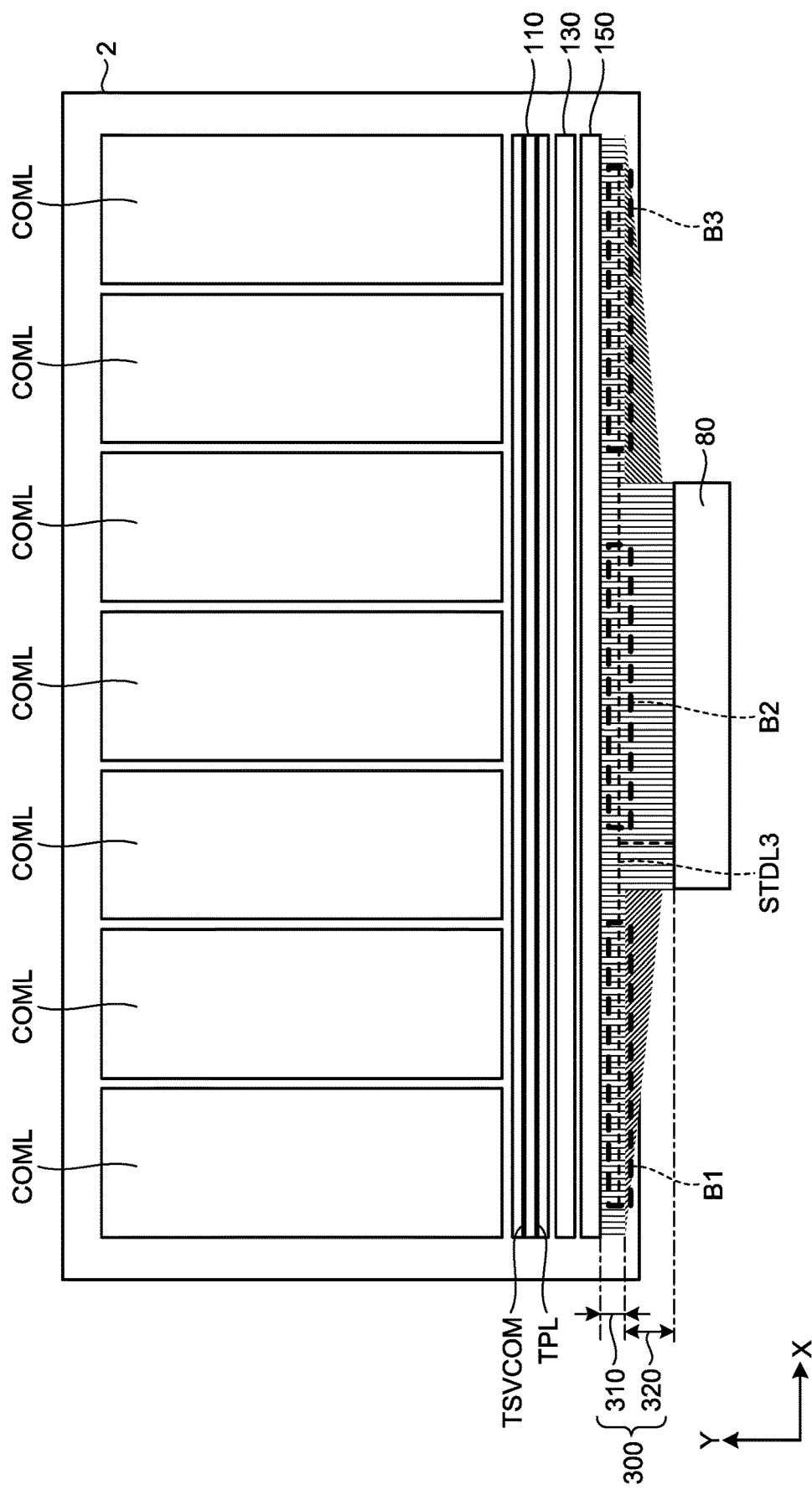
FIG. 26 is a schematic diagram illustrating an example in a case in which a detection region for the second touch detection is handled as a plurality of touch detection regions.
Figure 27:
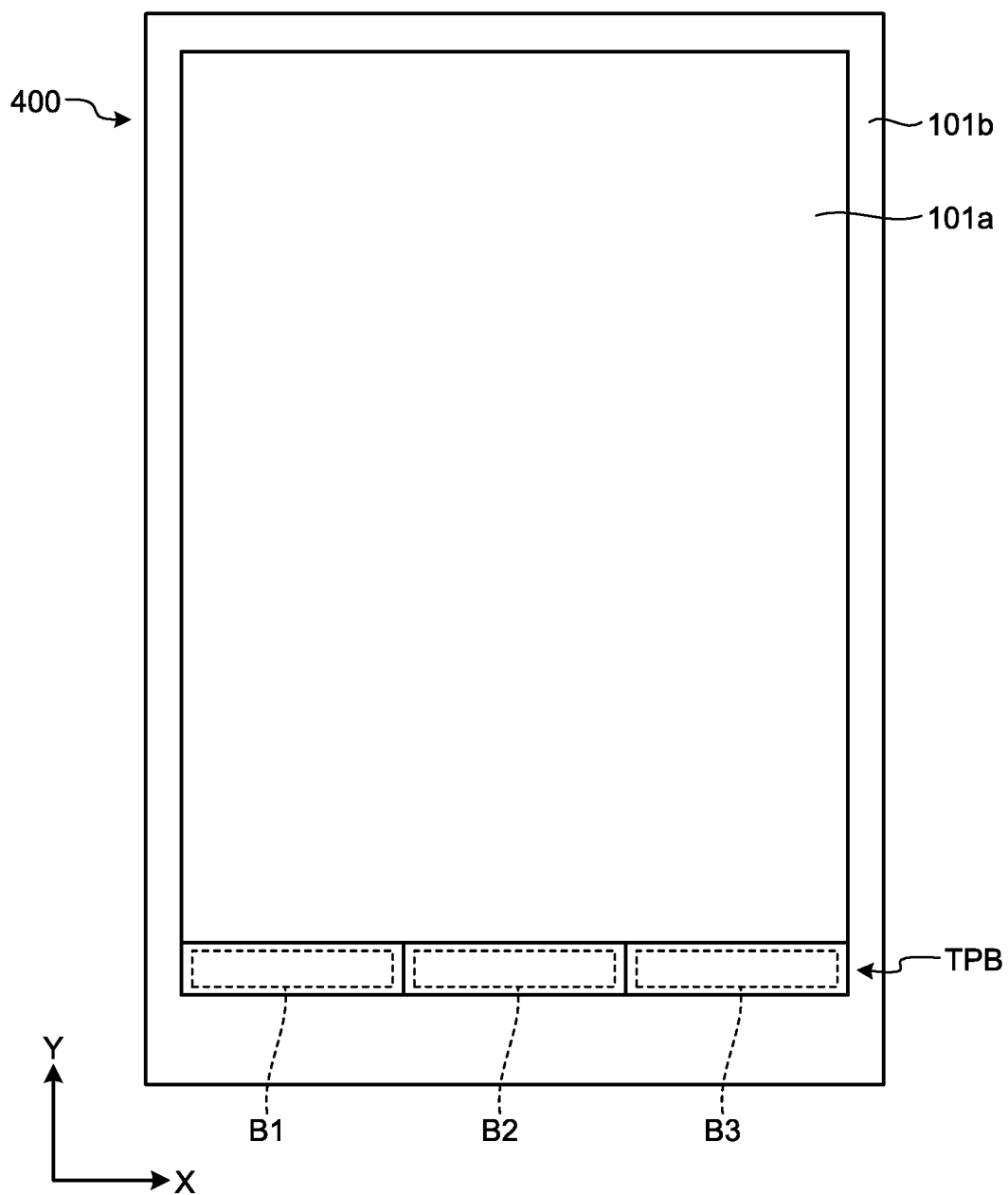
FIG. 27 is a schematic diagram illustrating an example of an electronic apparatus using each of the touch detection regions illustrated in FIG. 26 as an individual input region.

FIG. 26 is a schematic diagram illustrating an example in a case in which the detection region for the second touch detection is handled as a plurality of touch detection regions B1, B2, and B3. FIG. 27 is a schematic diagram illustrating an example of an electronic apparatus 400 using each of the touch detection regions B1, B2, and B3 illustrated in FIG. 26 as an individual input region. As illustrated in FIG. 26, the detection region for the second touch detection may be divided into a plurality of touch detection regions B1, B2, and B3, and a touch detection result in each of the touch detection regions B1, B2, and B3 may be individually handled. In this case, as illustrated in FIG. 27 for example, by arranging an individual input region (for example, a button in a button placement area TPB) in each of the touch detection regions B1, B2, and B3, a touch detection result obtained by the second touch detector 60 can be used for detecting whether there is an input operation on each input region.

FIG. 26 illustrates a second touch detection electrode STDL3 and the like having a greater width in a longitudinal direction than that of the second touch detection electrode STDL illustrated in FIG. 14 to represent the detection region for the second touch detection to be larger, but the width of the second touch detection electrode is arbitrary as described above in the second embodiment. The number of touch detection regions obtained by dividing the detection region for the second touch detection can be appropriately modified.

The first touch detection and the second touch detection may be performed at different timings as described in the second embodiment, for example, or may be performed in parallel without being limited to the example described in the second embodiment.

Numerical values such as the number of the drive electrodes COML, the number of the first touch detection electrodes TDL, and the number of the second touch detection electrodes STLD exemplified in the embodiments and illustrated in the drawings are merely an example, and can be appropriately modified.

What is claimed is:

1. A display apparatus with a touch detector, the display apparatus comprising:
   a display device including a display region in which a plurality of pixels are arranged;
   a plurality of driving lines providing driving signals to the pixels;
   a plurality of outer display region wires respectively coupled to the driving lines and extending along a predetermined direction outside the display region; and
   a touch detection electrode crossing the outer display region wires,
   wherein the touch detection electrode and the outer display region wires, which are disposed outside the display region and used to transmit driving signals to the pixels through the driving lines, form capacitance to detect an external object outside the display region.

2. The display apparatus with a touch detector according to claim 1, the display apparatus further comprising a plurality of switches respectively coupled between the outer display region wires and corresponding driving lines.

3. The display apparatus with a touch detector according to claim 1, the display apparatus further comprising a touch panel for detecting a touch operation in the display region.

4. The display apparatus with a touch detector according to claim 3, wherein detection of the external object outside the display region is performed at a timing different from a timing at which detection of the touch operation in the display region is performed.

5. The display apparatus with a touch detector according to claim 3, wherein detection of the external object outside the display region is performed in parallel with detection of the touch operation in the display region.

6. The display apparatus with a touch detector according to claim 1, wherein the touch detection electrode is a mutual capacitance touch detection electrode that forms capacitance between the touch detection electrode and the outer display region wires.

7. The display apparatus with a touch detector according to claim 1, wherein a touch driving signal is applied to each of the outer display region wires, and a detection signal is output from the touch detection electrode in response to the touch driving signal.

8. The display apparatus with a touch detector according to claim 7, the display apparatus further comprising a switching circuit coupled between the driving lines and the outer display region wires, wherein the switching circuit is in OFF state when the touch driving signal is applied to each of the outer display region wires.

9. The display apparatus with a touch detector according to claim 8, wherein the switching circuit is in ON state when the driving signals are transmitted to the pixel electrodes.

10. The display apparatus with a touch detector according to claim 8,
    wherein the display device further comprises:
      a first substrate; and
      a second substrate opposed to the first substrate with a liquid crystal layer there between,
    wherein the first substrate includes the plurality of pixels, the plurality of driving lines, the switching circuit, the plurality of outer display region wires, and the touch detection electrode.

11. The display apparatus with a touch detector according to claim 8,
    wherein the display device further comprises:
      a first substrate; and
      a second substrate opposed to the first substrate with a liquid crystal layer there between,
    wherein the first substrate includes the plurality of pixels, the plurality of driving lines, switching circuit, and the plurality of outer display region wires, and
    wherein the second substrate includes the touch detection electrode.

12. The display apparatus with a touch detector according to claim 8,
    wherein the display device further comprises:
      a plurality of display area touch detection electrodes extending in the first direction arranged in the second direction crossing the first; and
      a plurality of common electrodes crossing the display area detection electrodes, the common electrodes are used to display an image when the driving signals are transmitted to the pixels, and used to detect the touch operation on the display region when the touch driving signal is applied to the common electrodes.

13. The display apparatus with a touch detector according to claim 7, wherein
    the touch driving signal is applied to the outer display region wires in a touch detection period that is divided into a plurality of sub touch detection periods, and a plurality of touch detection signals each of which is output from the touch detection electrode in each of the sub touch detection periods are combined to obtain a two-dimension image of the external object.

14. The display apparatus with a touch detector according to claim 7,
wherein the display device comprises:
a driver integrated circuit configured to output at least one of the driving signals or the touch driving signal.

15. The display apparatus with a touch according to claim 1, wherein
the display device displays an image in a display period,
the touch detection electrode detect the external object in an outer touch detection period that is different from the display period, and
the display apparatus further comprising a switching circuit that switches between
electrically coupling the display device with the outer display region wires in the display period, and
electrically decoupling the display device from the outer display region wires in the outer touch detection period.

* * * * *